United States Patent
Koga

(10) Patent No.: US 9,939,791 B2
(45) Date of Patent: Apr. 10, 2018

(54) INFORMATION PROVIDING DEVICE AND NON-TRANSITORY COMPUTER READABLE MEDIUM STORING INFORMATION PROVIDING PROGRAM

(71) Applicant: TOYOTA JIDOSHA KABUSHIKI KAISHA, Toyota-shi, Aichi-ken (JP)

(72) Inventor: Ko Koga, Tokyo (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/452,106

(22) Filed: Mar. 7, 2017

(65) Prior Publication Data

US 2017/0261947 A1 Sep. 14, 2017

(30) Foreign Application Priority Data

Mar. 11, 2016 (JP) ................. 2016-048580

(51) Int. Cl.
| | |
|---|---|
| *G05B 13/02* | (2006.01) |
| *B60R 16/037* | (2006.01) |
| *B60W 40/09* | (2012.01) |
| *B60W 50/10* | (2012.01) |
| *G06N 5/00* | (2006.01) |
| *G06N 5/04* | (2006.01) |

(52) U.S. Cl.
CPC ...... *G05B 13/0265* (2013.01); *B60R 16/0373* (2013.01); *B60W 40/09* (2013.01); *B60W 50/10* (2013.01); *G06N 5/00* (2013.01); *G06N 5/04* (2013.01)

(58) Field of Classification Search
CPC combination set(s) only.
See application file for complete search history.

(56) References Cited

U.S. PATENT DOCUMENTS

| | | | |
|---|---|---|---|
| 6,679,702 B1 * | 1/2004 | Rau ................. | G09B 9/02 |
| | | | 340/435 |
| 9,177,475 B2 * | 11/2015 | Sellschopp ........ | G01C 21/3484 |
| 2011/0153532 A1 * | 6/2011 | Kuge ................. | B60W 40/09 |
| | | | 706/12 |

(Continued)

FOREIGN PATENT DOCUMENTS

| | | |
|---|---|---|
| JP | 2003-248688 A | 9/2003 |
| JP | 2009-230334 A | 10/2009 |
| WO | 2015/162638 A1 | 10/2015 |

*Primary Examiner* — Mussa A Shaawat
(74) *Attorney, Agent, or Firm* — Sughrue Mion, PLLC

(57) ABSTRACT

An information providing device includes an agent ECU that sets a reward function through the use of history data on a response, from a driver, to an operation proposal for an in-vehicle component, and calculates a probability distribution of performance of each of actions constructing an action space in each of states constructing a state space, through reinforced learning based on the reward function. The agent ECU calculates a dispersion degree of the probability distribution. The agent ECU makes a trial-and-error operation proposal to select a target action from a plurality of candidates and output the target action when the dispersion degree of the probability distribution is equal to or larger than a threshold, and makes a definitive operation proposal to fix and output a target action when the value of the dispersion degree of the probability distribution is smaller than the threshold.

11 Claims, 16 Drawing Sheets

(56) References Cited

U.S. PATENT DOCUMENTS

| | | | |
|---|---|---|---|
| 2012/0072259 A1 | 3/2012 | Morimura et al. | |
| 2012/0253823 A1* | 10/2012 | Schalk | G01C 21/3608 704/270.1 |
| 2014/0128144 A1* | 5/2014 | Bavitz | A63F 9/24 463/23 |
| 2017/0010859 A1 | 1/2017 | Hirai | |
| 2017/0217424 A1* | 8/2017 | Park | B60W 20/12 |

* cited by examiner

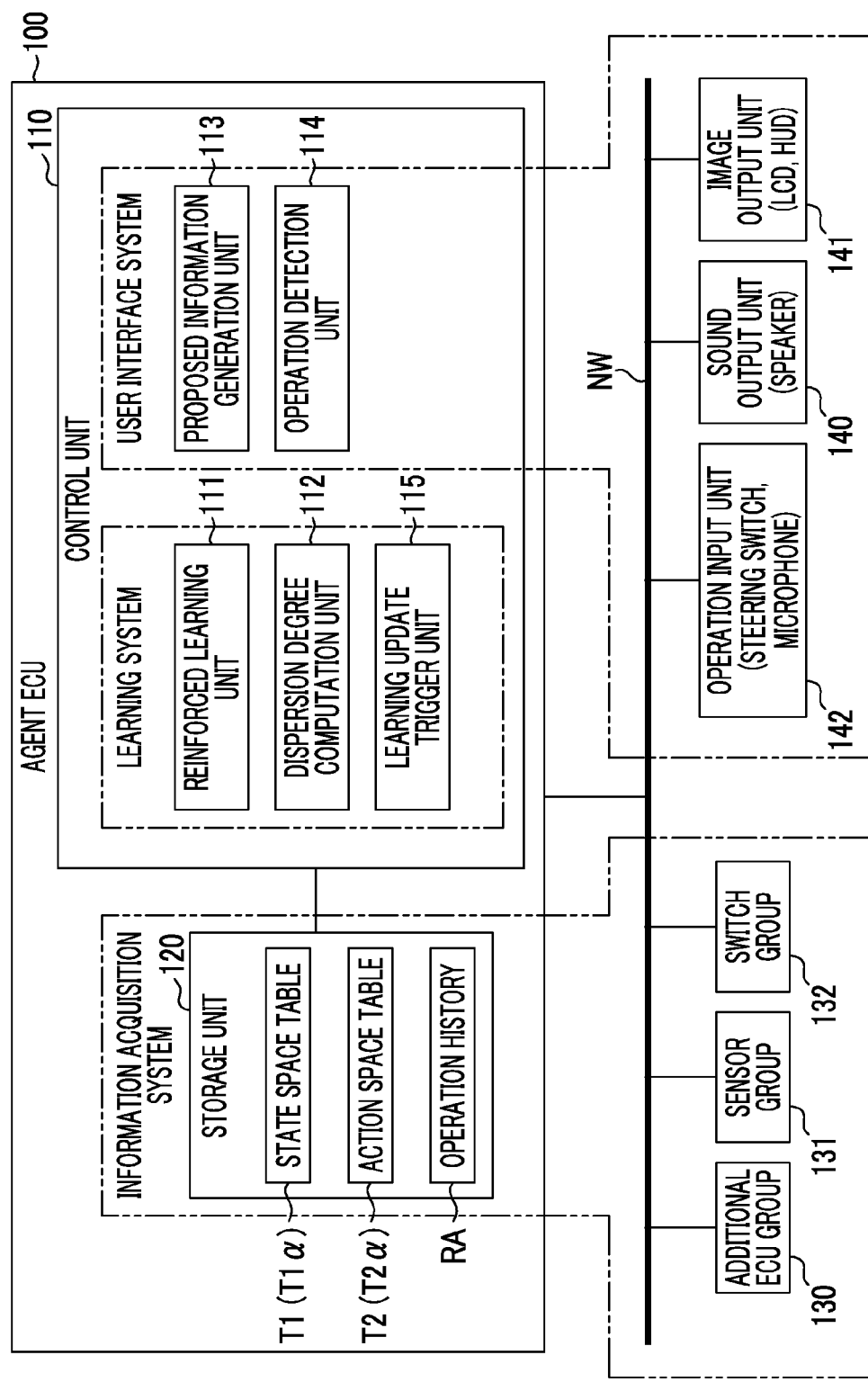

FIG. 2

| | | OPERATION/SITUATION OF IN-VEHICLE COMPONENTS | | | ATTRIBUTE (CHARACTERISTICS OF PASSENGER(S) OF VEHICLE) | | | | | RUNNING SITUATION OF VEHICLE | |
|---|---|---|---|---|---|---|---|---|---|---|---|
| | DESTINATION | CLOCK TIME | DAY OF WEEK | PRESENT LOCATION | SPOUSE | CHILD(REN) | FELLOW PASSENGER(S) | HOBBY | PURPOSE | TRAFFIC SITUATION | WEATHER |
| PARAMETER | OWN HOME | 0:00 | MONDAY | OWN HOME | NO | NO | NO | YES | WORK | EMPTY | SUNNY |
| | PARENTS' HOME | 1:00 | TUESDAY | PARENTS' HOME | YES | YES | 1 | NO | PICKUP | SPARSE | CLOUDY |
| | PLACE 1 | 2:00 | WEDNESDAY | PLACE 1 | | | 2 | | SHOPPING | INTERMEDIATE | RAINY |
| | PLACE 2 | 3:00 | THURSDAY | PLACE 2 | | | 3 | | HOMECOMING VISIT | CONGESTED | POURING |
| | PLACE 3 | 4:00 | FRIDAY | PLACE 3 | | | 4 | | LEISURE (CITY) | EXTREMELY CONGESTED | TYPHONIC |
| | PLACE 4 | 5:00 | SATURDAY | PLACE 4 | | | 5 | | LEISURE (MOUNTAIN) | SOLO TRIP | FOGGY |
| | PLACE 5 | 6:00 | SUNDAY | PLACE 5 | | | 6 | | LEISURE (SEA) | | SNOWY |
| | PLACE 6 | 7:00 | | PLACE 6 | | | 7 | | | | |
| | | ... | | ... | | | | | | | |
| | | 23:00 | | PLACE n | | | | | | | |

| STATE No | DA1 DESTINATION | DA2 CLOCK TIME | DA3 DAY OF WEEK | DA4 PRESENT LOCATION | DB1 SPOUSE | DB2 CHILD (REN) | DB3 FELLOW PASSENGER(S) | DB4 HOBBY | DB5 PURPOSE | DC1 TRAFFIC SITUATION | DC2 WEATHER T1 |
|---|---|---|---|---|---|---|---|---|---|---|---|
| s1 | OWN HOME | 0:00 | MONDAY | OWN HOME | NO | NO | NO | YES | WORK | EMPTY | SUNNY |
| s2 | PARENTS' HOME | 0:00 | MONDAY | OWN HOME | NO | NO | NO | YES | WORK | EMPTY | SUNNY |
| ... | ... | ... | ... | ... | ... | ... | ... | ... | ... | ... | ... |
| sm | PLACE 6 | 23:00 | SUNDAY | PLACE n | YES | YES | 7 | NO | LEISURE (SEA) | SOLO TRIP | SNOWY |

FIG. 4

| | OPERATION/SITUATION OF IN-VEHICLE COMPONENTS | | | | ATTRIBUTE | CHARACTERISTICS (OF PASSENGER(S) OF VEHICLE) | | | | RUNNING SITUATION OF VEHICLE |
|---|---|---|---|---|---|---|---|---|---|---|
| | SOUND SOURCE | REPEAT | SOUND VOLUME | CLOCK TIME | DAY OF WEEK | PRESENT LOCATION | SPOUSE | CHILD(REN) | FELLOW PASSENGER(S) | DROWSINESS | ENVIRONMENT |
| PARAMETER | NO | NOT SET | MUTE | 0:00 | MONDAY | OWN HOME | NO | NO | NO | MUCH | URBAN AREA |
| | FM A | ALBUM REPEATED | LOUD | 1:00 | TUESDAY | PARENTS' HOME | YES | YES | 1 | INTERMEDIATE | SUBURB |
| | FM B | ONE SONG REPEATED | MIDDLE | 2:00 | WEDNESDAY | PLACE 1 | | | 2 | LITTLE | COUNTRYSIDE |
| | FM C | ALL SONGS REPEATED | QUIET | 3:00 | THURSDAY | PLACE 2 | | | 3 | NO | GRAVEL |
| | FM D | | | 4:00 | FRIDAY | PLACE 3 | | | 4 | | WINDING ROAD |
| | SONG 1 IN PORTABLE TERMINAL | | | 5:00 | SATURDAY | PLACE 4 | | | 5 | | COASTAL AREA |
| | SONG 2 IN PORTABLE TERMINAL | | | 6:00 | SUNDAY | PLACE 5 | | | 6 | | MOUNTAIN ROAD |
| | SONG 1 ON CD | | | 7:00 | | PLACE 6 | | | 7 | | |
| | ... | | | ... | | ... | | | | | |
| | SONG n ON CD | | | 23:00 | | PLACE n | | | | | |

FIG. 5

| STATE No | DA1α SOUND SOURCE | DA2α REPEAT | DA3α SOUND VOLUME | DA4α CLOCK TIME | DA5α DAY OF WEEK | DA6α PRESENT LOCATION | DB1α SPOUSE | DB2α CHILD (REN) | DB3α FELLOW PASSENGER(S) | DB4α DROWSINESS | DC1α ENVIRONMENT |
|---|---|---|---|---|---|---|---|---|---|---|---|
| s1 | NO | NOT SET | MUTE | 0:00 | MONDAY | PARENTS' HOME | NO | NO | 1 | MUCH | URBAN AREA |
| s2 | FM A | NOT SET | MUTE | 0:00 | MONDAY | PARENTS' HOME | NO | NO | 1 | MUCH | URBAN AREA |
| ... | ... | ... | ... | ... | ... | ... | ... | ... | ... | ... | ... |
| sn | SONG n ON CD | ALL SONGS REPEATED | QUIET | 23:00 | SUNDAY | PLACE n | YES | YES | 7 | NO | MOUNTAIN ROAD |

| ACTION No | SETTING OF DESTINATION |
|---|---|
| a1 | OWN HOME |
| a2 | PARENTS' HOME |
| a3 | PLACE 1 |
| a4 | PLACE 2 |
| a5 | PLACE 3 |
| a6 | PLACE 4 |
| a7 | PLACE 5 |
| a8 | PLACE 6 |

| ACTION No | SETTING OF SOUND |
|---|---|
| a1 | NO |
| a2 | FM A |
| a3 | FM B |
| a4 | FM C |
| a5 | FM D |
| a6 | SONG 1 IN PORTABLE TERMINAL |
| a7 | SONG 2 IN PORTABLE TERMINAL |
| a8 | SONG 1 ON CD |
| ⋮ | ⋮ |
| a100 | SONG n ON CD |

FIG. 8

TRANSITION PROBABILITY MATRIX P (st, at)

|  | ACTION A | | | |
|---|---|---|---|---|
|  | a1 | a2 | ... | a100 |
| s1 | 0.01 | 0.10 | ... | 0.03 | → $H_1 = \sum_{a \in A} -p \cdot \log p$
| s2 | 0.05 | 0.03 | ... | 0.02 | → $H_2 = \sum_{a \in A} -p \cdot \log p$
| ... | ... | ... | ... | ... |
| sn | 0.02 | 0.13 | ... | 0.04 | → $H_n = \sum_{a \in A} -p \cdot \log p$

STATE S

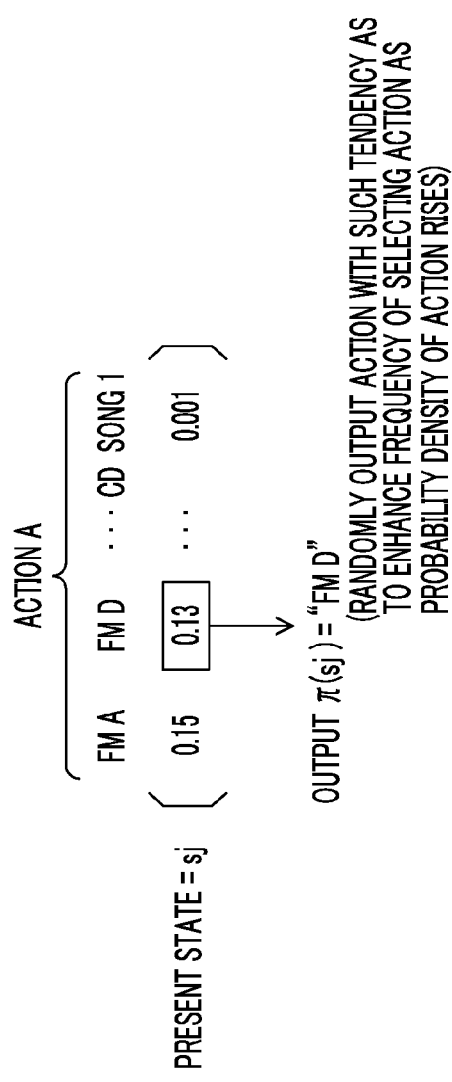

FIG. 14

| DEFINITIVE OPERATION PROPOSAL |
|---|
| AGENT "IS DESTINATION YOUR OWN HOME BY ANY CHANCE?"<br>DRIVER "Yes. (SOUND COMMAND)"<br>AGENT "DESTINATION HAS BEEN SET AS YOUR OWN HOME, WHICH IS YOUR USUAL DESTINATION" |

FIG. 15

| TRIAL-AND-ERROR OPERATION PROPOSAL |
|---|
| AGENT "SHALL I SEARCH WHAT YOU WANT TO LISTEN TO?"<br>DRIVER "Yes. (SOUND COMMAND)"<br>AGENT "HOW ABOUT FM A?"<br>DRIVER "(OH, THIS AGENT KNOWS MY TASTE WELL, I SEE PROGRAM 1 IS ON THE AIR, SO I FEEL LIKE LISTENING TO IT!) Yes."<br>AGENT "I WILL CHOOSE A"<br>··· BASEBALL GAME BROADCAST STARTS<br>DRIVER "UH-OH, THEY'VE GOT A BASEBALL GAME BROADCAST TODAY··· (DISAPPOINTED)"<br>AGENT "SHALL I CONTINUE WITH A?"<br>DRIVER "No."<br>AGENT "HOW ABOUT SONG n ON CD?"<br>DRIVER "HMM, I USUALLY LIKE SONG n, BUT I'M NOT IN THE MOOD FOR IT TODAY··· No."<br>AGENT "HOW ABOUT SONG 2 ON CD?"<br>DRIVER "GREAT, THAT'S WHAT I WANT! Yes." |

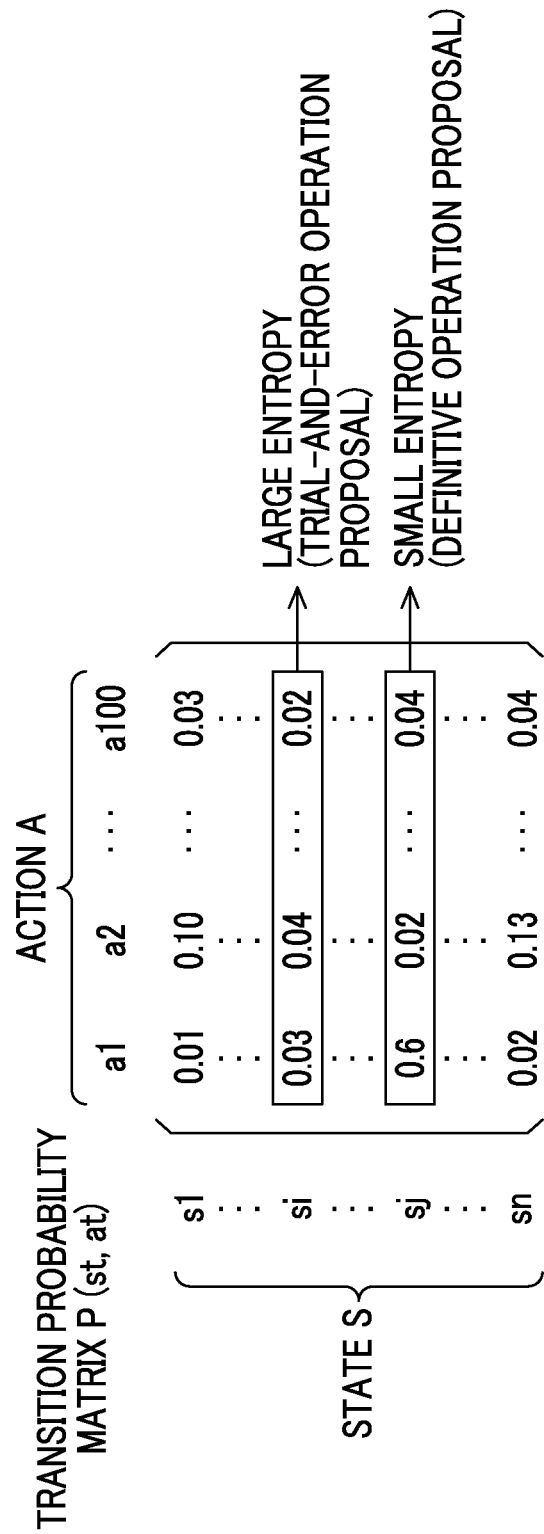

INFORMATION PROVIDING DEVICE AND NON-TRANSITORY COMPUTER READABLE MEDIUM STORING INFORMATION PROVIDING PROGRAM

INCORPORATION BY REFERENCE

The disclosure of Japanese Patent Application No. 2016-048580 filed on Mar. 11, 2016 including the specification, drawings and abstract is incorporated herein by reference in its entirety.

BACKGROUND

1. Technical Field

The disclosure relates to an information providing device and a non-transitory computer readable medium storing an information providing program that accumulate and learn history data on a response, from a user (a driver), to provided information and provide information matching the user's (the driver's) intention based on a result of the learning.

2. Description of Related Art

As this kind of information provision device, there is known a device (a user interface system) described in, for example, WO 2015/162638. In this device, when performing a sound input function, candidates of a sound operation that will be performed by a user (a driver) using information on the situation of a vehicle at the present time point are first estimated, and three of the estimated candidates of the sound operation are displayed as options in descending order of probability by a touch panel. Subsequently, it is determined which one of these options has been selected by the driver through manual input, and a target of the sound operation is decided. Also, a guidance that urges the user to input a sound is generated in accordance with the decided target of the sound operation, and is output. After that, the driver inputs the sound in accordance with this guidance, thereby deciding and performing a target vehicle function. Then, an entrance of the sound operation that matches the user's intention is thus provided in accordance with the situation of the vehicle at the present time point, so the operation burden imposed on the user who inputs the sound is reduced.

By the way, in the device described in the aforementioned document, when performing the vehicle function, the user interface is changed over from an operation mode based on manual input to an operation mode based on sound input for the options displayed by the touch panel. Therefore, the burden imposed on the driver inevitably increases.

Besides, in the device described in the aforementioned document, the entrance of the sound operation is simplified, but the following operation realizes nothing more than a function similar to that of an existing speech dialog system. Consequently, the burden imposed on the driver has been desired to be further reduced.

SUMMARY

The disclosure provides an information providing device and a non-transitory computer readable medium storing an information providing program that can make a more appropriate operation proposal for an in-vehicle component in such a manner as to match a driver's intention as the providing of information while restraining the driver from being burdened, by consistently using a simple user interface.

An information providing device according to a first aspect of the disclosure is equipped with an agent electronic control unit. The agent ECU has a state space construction unit, an action space construction unit, a reinforced learning unit, a dispersion degree computation unit, and an information providing unit. The state space construction unit is configured to define a state of a vehicle by associating a plurality of types of vehicle data with one another, and construct a state space as a set of a plurality of states. The action space construction unit is configured to define, as an action, data indicating contents of an operation of an in-vehicle component that is performed through a response, from a driver, to an operation proposal for the in-vehicle component, and construct an action space as a set of a plurality of actions. The reinforced learning unit is configured to accumulate a history of the response, from the driver, to the operation proposal for the in-vehicle component, set a reward function as an index representing an appropriateness degree of the operation proposal for the in-vehicle component while using the accumulated history, and calculate a probability distribution of performance of each of the actions constructing the action space in each of the states constructing the state space, through reinforced learning based on the reward function. The dispersion degree computation unit is configured to compute a dispersion degree of the probability distribution that is calculated by the reinforced learning unit. The information providing unit is configured to make a definitive operation proposal to fix a target action as a target of the operation proposal and output this target action when the dispersion degree of the probability distribution that is computed by the dispersion degree computation unit is smaller than a threshold, and make a trial-and-error operation proposal to select the target action as the target of the operation proposal from a plurality of candidates and output this target action when the dispersion degree of the probability distribution that is computed by the dispersion degree computation unit is equal to or larger than the threshold.

Besides, in a non-transitory computer readable medium storing an information providing program according to a second aspect of the disclosure, the information providing program is programmed to cause a computer to realize a state space construction function, an action space construction function, a reinforced learning function, a dispersion degree computation function, and an information providing function. The state space construction function is designed to define a state of a vehicle by associating a plurality of types of vehicle data with one another, and construct a state space as a set of a plurality of states. The action space construction function is designed to define, as an action, data indicating contents of an operation of an in-vehicle component that is performed through a response, from a driver, to an operation proposal for the in-vehicle component, and construct an action space as a set of a plurality of actions. The reinforced learning function is designed to accumulate a history of the response, from the driver, to the operation proposal for the in-vehicle component, set a reward function as an index representing an appropriateness degree of the operation proposal for the in-vehicle component while using the accumulated history, and calculate a probability distribution of performance of each of the actions constructing the action space in each of the states constructing the state space, through reinforced learning based on the reward function. The dispersion degree computation function is designed to compute a dispersion degree of the probability distribution that is calculated through the reinforced learning function. The information providing function is designed to make a definitive operation proposal to fix a target action as a target of the operation proposal and output this target action when the dispersion degree of the probability distribution that is computed through the dispersion degree computation function is smaller than a threshold, and to make a trial-and-error operation proposal to select the target action as the target of the operation proposal from a plurality of candidates and output this target action when the dispersion degree of the probability distribution that is computed through the dispersion degree computation function is equal to or larger than the threshold.

In each of the aforementioned first and second aspects of the disclosure, the reward function is set as the index representing the appropriateness degree of the operation proposal for the in-vehicle component, while using the history of the response, from the driver, to the operation proposal for the in-vehicle component. Then, a decision-making model of the driver as to the operation proposal for the in-vehicle component in each of the states is structured through reinforced learning based on this reward function. Besides, the probability distribution of the contents of the operation of the in-vehicle component that is performed through the response, from the driver, to the operation proposal for the in-vehicle component in each of the states is calculated, while using this structured model. It should be noted herein that the dispersion degree of the probability distribution of the contents of the operation of the in-vehicle component usually differs depending on the target of the operation proposal for the in-vehicle component. For example, in the case where the target of the operation proposal for the in-vehicle component is sound reproduction, this target is generally susceptible to the driver's state of mind at that time and the like as well as the state of the vehicle, and there are a variety of options. Therefore, the dispersion degree of the probability distribution of the contents of the operation of the in-vehicle component is likely to be large. On the other hand, in the case where the target of the operation proposal for the in-vehicle component is the setting of a destination, it is generally easier to limit the number of options from the state of the vehicle on each occasion than in the case of sound reproduction. Therefore, the dispersion degree of the probability distribution of the contents of the operation of the in-vehicle component is likely to be small. In this respect, according to the aforementioned configuration, when the dispersion degree of the probability distribution is smaller than the threshold, the definitive operation proposal is made to fix the target action as the target of the operation proposal and output this target action. Thus, the operation proposal for the in-vehicle component that matches the driver's intention is made without bothering the driver to select the contents of the operation of the in-vehicle component. On the other hand, in the aforementioned configuration, when the dispersion degree of the probability distribution is equal to or larger than the threshold, the try-and-error operation proposal is made to select the target action as the target of the operation proposal from the plurality of the candidates and output this target action. Thus, the operation proposal for the in-vehicle component that matches the driver's intention is more adequately made. That is, in the aforementioned configuration, only a single content of the operation of the in-vehicle component is output at a time as the target of the operation proposal, regardless of whether the dispersion degree of the probability distribution is large or small. Therefore, the driver has only to express his or her will, that is, whether to agree to the content of the operation of the in-vehicle component that is proposed on each occasion. Therefore, responses to different types of operation proposals for the in-vehicle component with different dispersion degrees of probability distribution, such as the setting of a destination and sound reproduction, can be consistently made while using the same simple user interface. Thus, the operation proposal for the in-vehicle component that matches the driver's intention can be made while restraining the driver from being bothered.

An information providing device according to a third aspect of the disclosure is equipped with an agent electronic control unit. The agent ECU has a state space construction unit, an action space construction unit, a reinforced learning unit, a dispersion degree computation unit, and an information providing unit. The state space construction unit is configured to define a state of a vehicle by associating a plurality of types of vehicle data with one another, and construct a state space as a set of a plurality of states. The action space construction unit is configured to define, as an action, data indicating contents of an operation of an in-vehicle component that is performed through a response, from a driver, to an operation proposal for the in-vehicle component, and construct an action space as a set of a plurality of actions. The reinforced learning unit is configured to accumulate a history of the response, from the driver, to the operation proposal for the in-vehicle component, set a reward function as an index representing an appropriateness degree of the operation proposal for the in-vehicle component while using the accumulated history, and calculate a probability distribution of performance of each of the actions constructing the action space in each of the states constructing the state space, through reinforced learning based on the reward function. The dispersion degree computation unit is configured to compute a dispersion degree of the state space by summating the dispersion degree of the probability distribution that is calculated by the reinforced learning unit as to the plurality of the states constructing the state space. The information providing unit is configured to make a definitive operation proposal to fix a target action as a target of the operation proposal and output this target action when the dispersion degree of the state space that is computed by the dispersion degree computation unit is smaller than a threshold, and make a trial-and-error operation proposal to select the target action as the target of the operation proposal from a plurality of candidates and output this target action when the dispersion degree of the state space that is computed by the dispersion degree computation unit is equal to or larger than the threshold.

In a non-transitory computer readable medium storing an information providing program according to a fourth aspect of the disclosure, the information providing program is programmed to cause a computer to realize a state space construction function, an action space construction function, a reinforced learning function, a dispersion degree computation function, and an information providing function. The state space construction function is designed to define a state of a vehicle by associating a plurality of types of vehicle data with one another, and construct a state space as a set of a plurality of states. The action space construction function is designed to define, as an action, data indicating contents of an operation of an in-vehicle component that is performed through a response, from a driver, to an operation proposal for the in-vehicle component, and construct an action space as a set of a plurality of actions. The reinforced learning function is designed to accumulate a history of the response, from the driver, to the operation proposal for the in-vehicle component, set a reward function as an index representing an appropriateness degree of the operation proposal for the in-vehicle component while using the accumulated history, and calculate a probability distribution of performance of each of the actions constructing the action space in each of the states constructing the state space, through reinforced learning based on the reward function. The dispersion degree computation function is designed to compute a dispersion degree of the state space by summating the dispersion degree of the probability distribution that is calculated through the reinforced learning function as to the plurality of the states constructing the state space. The information providing function is designed to make a definitive operation proposal to fix a target action as a target of the operation proposal and output this target action when the dispersion degree of the state space that is computed through the dispersion degree computation function is smaller than a threshold, and to make a trial-and-error operation proposal to select the target action as the target of the operation proposal from a plurality of candidates and output this target action when the dispersion degree of the state space that is computed through the dispersion degree computation function is equal to or larger than the threshold.

According to each of the aforementioned third and fourth aspects of the disclosure, the reward function is set as the index representing the appropriateness degree of the operation proposal for the in-vehicle component, while using the history of the response, from the driver, to the operation proposal for the in-vehicle component. Then, a decision-making model of the driver as to the operation proposal for the in-vehicle component in each of the states is structured through reinforced learning based on this reward function. Besides, the probability distribution of the contents of the operation of the in-vehicle component that is performed through the response, from the driver, to the operation proposal for the in-vehicle component in each of the states is calculated, while using this structured model. It should be noted herein that the dispersion degree of the probability distribution of the contents of the operation of the in-vehicle component usually differs depending on the target of the operation proposal for the in-vehicle component. For example, in the case where the target of the operation proposal for the in-vehicle component is sound reproduction, this target is generally susceptible to the driver's state of mind at that time and the like as well as the state of the vehicle, and there are a variety of options. Therefore, the dispersion degree of the probability distribution of the contents of the operation of the in-vehicle component is likely to be large. On the other hand, in the case where the target of the operation proposal for the in-vehicle component is the setting of a destination, it is generally easier to limit the number of options from the state of the vehicle on each occasion than in the case of sound reproduction. Therefore, the dispersion degree of the probability distribution of the contents of the operation of the in-vehicle component is likely to be small. In this respect, according to the aforementioned configuration, when the dispersion degree of the state space that has been obtained from the summated value of dispersion degrees of the probability distribution is smaller than the threshold, the definitive operation proposal is made to fix the target action as the target of the operation proposal and output this target action. Thus, the operation proposal for the in-vehicle component that matches the driver's intention is made without bothering the driver to select the contents of the operation of the in-vehicle component. On the other hand, in the aforementioned configuration, when the dispersion degree of the state space that has been obtained from the summated value of dispersion degrees of the probability distribution is equal to or larger than the threshold, the try-and-error operation proposal is made to select the target action as the target of the operation proposal from the plurality of the candidates and output this target action. Thus, the operation proposal for the in-vehicle component that matches the driver's intention is more adequately made. That is, in the aforementioned configuration, only a single content of the operation of the in-vehicle component is output at a time as the target of the operation proposal regardless of whether the dispersion degree of the space state is large or small. Therefore, the driver has only to express his or her will, that is, whether to agree to the content of the operation of the in-vehicle component that is proposed on each occasion. Therefore, responses to different types of operation proposals for the in-vehicle component with different dispersion degrees of the state space, such as the setting of a destination and sound reproduction, can be consistently made while using the same simple user interface. Thus, the operation proposal for the in-vehicle component that matches the driver's intention can be made while restraining the driver from being burdened.

In the aforementioned second aspect of the disclosure, the reinforced learning unit may adopt, as a policy, mapping from each of the states constructing the state space to each of the actions constructing the action space, set, as a state value function, an expected value of a cumulative reward that is obtained when the policy is followed in each of the states, estimate, as an optimal action value function, an expected value of a cumulative reward that is always obtained when an optimal policy is followed after a predetermined action is selected from the action space in each of the states constructing the state space on an assumption that the optimal policy is the policy that maximizes the state value function in all the states constructing the state space, and calculate the probability distribution based on the estimated optimal action value function. The information providing unit may make the definitive operation proposal targeting an action that maximizes the optimal action value function in a present state, when the dispersion degree of the state space that is computed by the dispersion degree computation unit is smaller than the threshold.

In the aforementioned configuration, when the dispersion degree of the state space is smaller than the threshold, the definitive operation proposal is made targeting the action that maximizes the optimal action value function in the present state, namely, the action that is most valuable and that is assumed to be most likely to be taken by the driver in the present state. Thus, the operation proposal for the in-vehicle component that matches the driver's intention can be realized with higher reliability.

In the aforementioned information providing device, the information providing unit may be configured to make the trial-and-error operation proposal with such a tendency as to enhance a frequency of selecting an action as a target as a probability density of the probability distribution of the action in the present state rises, when the dispersion degree of the state space that is computed by the dispersion degree computation unit is equal to or larger than the threshold.

In the aforementioned configuration, when the dispersion degree of the state space is equal to or larger than the threshold, the trial-and-error operation proposal is made with such a tendency as to select, as the target of the operation proposal for the in-vehicle component, an action with a high probability density of the probability distribution in the present state, namely, an action that is likely to be taken by the driver in the present state. Thus, even under the circumstances where it is difficult to specify the driver's action in advance as to the operation proposal for the in-vehicle component as a target, the operation proposal for the in-vehicle component that matches the driver's intention can be realized with higher reliability.

In the aforementioned information providing device, the dispersion degree computation unit may be configured to define, as an entropy, the dispersion degree of the probability distribution of performance of each of the actions constructing the action space in each of the states constructing the state space, and define the dispersion degree of the state space as an average entropy. The information providing unit may be configured to select the definitive operation proposal or the trial-and-error operation proposal with such a tendency as to enhance a frequency of making the trial-and-error operation proposal as an $\epsilon$-value increases, while using an $\epsilon$-greedy method in which a value of the average entropy is set as the $\epsilon$-value.

In the aforementioned configuration, the frequency of selecting the trial-and-error operation proposal is enhanced as the $\epsilon$-value as the value of the average entropy that defines the dispersion degree of the state space increases, namely, as the dispersion degree of the state space increases. In this manner as well, even under the circumstances where it is difficult to specify the driver's action as to the operation proposal for the in-vehicle component as a target, the operation proposal for the in-vehicle component that matches the driver's intention can be realized with higher reliability.

In the aforementioned information providing device, the reinforced learning unit may be configured to set, as the reward function, a frequency of performing the operation of the in-vehicle component through the driver's response to the operation proposal for the in-vehicle component, and update the reward function in accordance with a change in an operation history of the operation of the in-vehicle component when the in-vehicle component is operated in accordance with the operation proposal for the in-vehicle component.

In the aforementioned configuration, the reward function is set by applying the frequency of the action that is performed through the driver's response to the operation proposal for the in-vehicle component, as the index of the appropriateness degree of the operation proposal of the in-vehicle component as to the driver's intention. The reward function is updated every time the history of the response is changed. Thus, the probability distribution of performance of each of the actions constructing the action space in each of the states constructing the state space can be calculated in such a manner as to match the driver's intention. Also, the accuracy of the probability distribution is enhanced in such a manner as to suit the actual response made by the driver as an individual, as the frequency of the driver's response increases.

In the aforementioned information providing device, the state space construction unit may be configured to construct the state space as a set of states as a group of data that associate an operation situation of the in-vehicle component, characteristics of a passenger or passengers of the vehicle and a running situation of the vehicle with one another.

In the aforementioned configuration, each of the states constructing the state space is defined in consideration of elements influencing the operation proposal for the in-vehicle component that is made to the driver, such as the operation situation of the in-vehicle component, the characteristics of the passenger(s) of the vehicle, the running situation of the vehicle and the like, from a variety of points of view. Thus, the operation proposal for the in-vehicle component that matches the driver's intention can be made in such a manner as to more accurately suit the actual circumstances. Incidentally, in the aforementioned configuration, the number of states constructing the state space is also estimated to be enormous, as a result of considering various elements as described above. However, through the use of the method of reinforced learning in which the history data are accumulated and the accuracy is enhanced, the operation proposal for the in-vehicle component that matches the driver's intention can be realized even when an enormous number of teacher data are not prepared in advance as in the case where, for example, teacher-assisted learning is used.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 1 is a block diagram showing the general configuration of an information provision device according to the first embodiment;

FIG. 2 is a view showing an example of attributes of vehicle data that define a state space;

FIG. 3 is a view showing an example of set contents of a state space table;

FIG. 4 is a view showing another example of attributes of vehicle data that define a space state;

FIG. 5 is a view showing another example of set contents of a state space table;

FIG. 6 is a view showing an example of set contents of an action space table;

FIG. 7 is a view showing another example of set contents of an action space table;

FIG. 8 is a view showing an example of a transition probability matrix in taking each of actions constructing an action space in each of states constructing the state space;

FIG. 11A is a view showing another example of attributes of vehicle data that define a present state;

FIG. 11B is a view for illustrating a process of selecting an action that is used for a trial-and-error operational proposal in the state shown in FIG. 11A;

FIG. 14 is a view showing an example of contents of a conversation that is held between an agent ECU and a driver in such a manner as to include a definitive operational proposal;

FIG. 15 is a view showing an example of contents of a conversation that is held between the agent ECU and the driver in such a manner as to include a trial-and-error operational proposal;

FIG. 16 is a view for illustrating a process of selecting a definitive operational proposal and a trial-and-error operational proposal in an information provision device according to the second embodiment of the disclosure;

DETAILED DESCRIPTION OF EMBODIMENTS

First Embodiment

Figure 9:
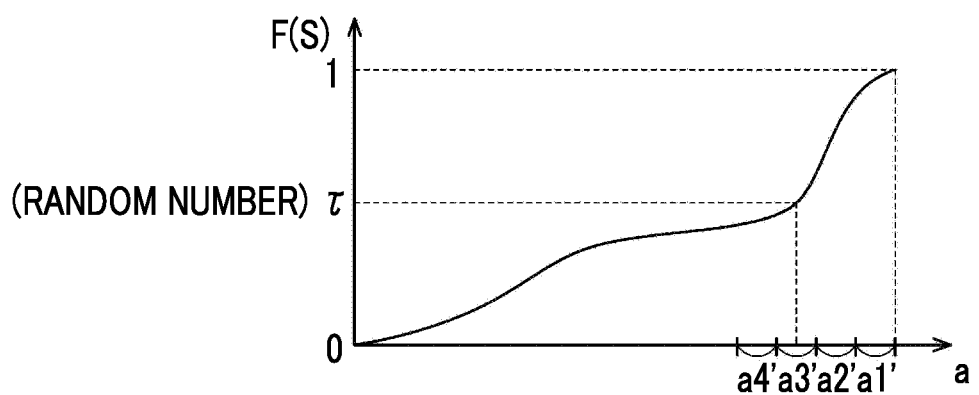
FIG. 9 is a graph showing an example of a cumulative distribution function that is used in making a trial-and-error operational proposal.

An information provision device according to the first embodiment of the disclosure will be described hereinafter. The information provision device according to the present embodiment of the disclosure is constituted by an agent ECU (an electronic control unit) that is mounted in a vehicle and that makes an operation proposal for in-vehicle components as the provision of information to a driver. It should be noted herein that the functions of the agent ECU are broadly classified into those of a learning system, those of an information acquisition system, and those of a user interface system. Moreover, the agent ECU carries out reinforced learning as a mode of learning in the learning system while classifying an operation history of the in-vehicle components according to a state of the vehicle on each occasion, based on various pieces of information acquired through the information acquisition system, and makes an operation proposal for the in-vehicle components through the user interface system based on a learning result obtained through the reinforced learning. It should be noted herein that reinforced learning is a learning method in which the agent ECU is adapted to an environment through trials and errors by giving some reward to the agent ECU as the environment changes based on a certain action, when the agent ECU selects this action based on the environment. Incidentally, in the present embodiment of the disclosure, the agent ECU defines a state by associating various vehicle data, for example, an operation situation of the in-vehicle components, characteristics of a passenger or passenger(s) of the vehicle, a running situation of the vehicle and the like with one another, and constructs a state space as a set of a plurality of states. Besides, the agent ECU defines, as an action, a type of an operation of the in-vehicle components that may be performed by the agent ECU instead of the driver as the driver gives a response to an operation proposal, and constructs an action space as a set of a plurality of actions. In addition, a history of the operation of the in-vehicle components that has been performed as a response to the operation proposal for the in-vehicle components in each of the states constructing the state space is equivalent to a reward in reinforced learning. Besides, the agent ECU calculates a probability distribution of performance of each of the actions constructing the action space in each of the states constructing the state space, by carrying out the above-mentioned reinforced learning. Besides, the agent ECU predicts an action that is likely to be taken by the driver from a state of the vehicle on each occasion, based on the probability distribution thus calculated, and makes an operation proposal for the in-vehicle components with a result of the prediction taken into account.

First of all, the configuration of the device according to the present embodiment of the disclosure will be described with reference to the drawings. As shown in FIG. 1, an agent ECU 100 has a control unit 110 that controls an operation proposal for in-vehicle components, and a storage unit 120 that stores an information provision program that is executed by the control unit 110 in making the operation proposal for the in-vehicle components and various data that are read and written by the control unit 110 in executing the information provision program. It should be noted herein that the various data that are stored in the storage unit 120 include state space tables T1 and T1α that define a state space, action space tables T2 and T2α that define an action space, and an operation history RA of the in-vehicle components. Each of the state space tables functions as a state space construction unit, and each of the action space tables functions as an action space construction unit. Incidentally, in the present embodiment of the disclosure, a plurality of types of services, for example, sound reproduction, the setting of a destination, the setting of an air-conditioner, the setting of a seat position, the setting of mirrors, the setting of wipers and the like are available as targets of the operation proposal. Moreover, the individual state space tables T1 and T1α and the individual action space tables T2 and T2α are stored in the storage unit 120 of the agent ECU 100 for each of these types of the services.

FIG. 2 shows an example of attributes of vehicle data that are used to define a state in setting a destination as an example of an operation proposal. It should be noted herein that the attributes of the vehicle data are registered in advance as elements contributing to the manner of setting the destination, and include vehicle data on an operation situation DA of the in-vehicle components, characteristics DB of a passenger or passengers of the vehicle and a running situation DC of the vehicle in the example shown in the drawing. Incidentally, a destination DA1, a clock time DA2, a day of the week DA3, and a present location DA4 are mentioned as an example of the vehicle data on the operation situation DA of the in-vehicle components. Besides, the presence or absence of a spouse DB1, the presence or absence of a child or children DB2, the number of fellow passengers DB3, the presence or absence of a hobby DB4, and a purpose DB5 are mentioned as an example of the vehicle data on the characteristics DB of the passenger(s) of the vehicle. Besides, a traffic situation (a congestion degree) DC1 and a weather DC2 are mentioned as an example of the vehicle data on the running situation DC of the vehicle.

Then, as shown in FIG. 3, the state space table T1 defines a state by combining the attributes of the vehicle data shown in FIG. 2 with one another in a round-robin manner, and constructs a state space as a set of a plurality of states. It should be noted herein that the number m of states included in the state space table T1 (e.g., about four million) increases as the number of types of elements constituting the attributes of the vehicle data (11 types including "destination" and "weather" as mentioned sequentially from the left, in the example shown in FIG. 2) or the number of parameters of each of the elements (e.g., 8 as the number of parameters of "destination" in the example shown in FIG. 2) increases.

On the other hand, FIG. 4 shows an example of the attributes of the vehicle data that are used to define a state in reproducing a sound as an example of an operation proposal. It should be noted herein that the attributes of the vehicle data are registered in advance as elements contributing to the manner of reproducing a sound, and include vehicle data on an operation situation DAα of the in-vehicle components, characteristics DBα of a passenger or passengers of the vehicle, and a running situation DCα of the vehicle. Incidentally, a sound source DA1α, the setting of repeat DA2α, a sound volume DA3α, a clock time DA4α, a day of the week DA5α, and a present location DA6α are mentioned as an example of the vehicle data on the operation situation DAα of the in-vehicle components. Besides, the presence or absence of a spouse DB1α, the presence or absence of a child or children DB2α, the number of fellow passengers DB3α, and a degree of drowsiness DB4α of the driver are mentioned as an example of the vehicle data on the characteristics DBα of the passenger(s) of the vehicle.

Besides, an environment DC1α including a degree of urbanization or suburbanization around the vehicle and a road environment is mentioned as an example of the vehicle data on the running situation DCα of the vehicle.

Then, as shown in FIG. 5, the state space table T1α defines a state by combining the attributes of the vehicle data shown in FIG. 4 with one another in a round-robin manner, and constructs a state space as a set of a plurality of states. In this case as well, the number n of states included in the state space table T1α (e.g., about 1.5 billion) increases as the number of types of elements constituting the attributes of the vehicle data or the number of parameters of each of the elements increases.

FIG. 6 shows an example of the action space table T2 that defines an action at the time when the agent ECU 100 sets a destination instead of the driver as an example of an operation proposal, and that constructs an action space as a set of a plurality of actions. In the example shown in the drawing, a list of place names of destinations to be set is mentioned as types of actions included in the action space. It should be noted herein that the places as the destinations to be set are registered in advance as, for example, the place names especially often set by the driver himself or herself in the past. In the example shown in the drawing, a total of 8 place names, namely, "place 1" to "place 6" as well as "own home" and "parents' home" are registered.

Besides, FIG. 7 shows an example of the action space table T2α that defines an action at the time when the agent ECU 100 reproduces a sound instead of the driver as an example of an operation proposal, and that constructs an action space as a set of a plurality of actions. In the example shown in the drawing, a list of sound sources to be reproduced is mentioned as types of actions included in the action space. It should be noted herein that the sound sources to be reproduced are registered in advance as, for example, sound sources especially often reproduced by the driver in the past. In the example shown in the drawing, a total of 100 sound sources including the names of radio stations and the titles of songs saved in storage media such as a portable terminal, compact discs (CD's) and the like are registered.

Besides, as shown in FIG. 1, the agent ECU 100 is connected to an additional ECU group 130, a sensor group 131 and a switch group 132 via a vehicle network NW that is configured as, for example, a controller area network (a CAN) or the like.

The additional ECU group 130 is constituted of in-vehicle ECU's that control the operation of the various in-vehicle components. The additional ECU group 130 includes an in-vehicle ECU of a vehicle drive system that controls an engine, a brake, a steering wheel and the like, an in-vehicle ECU of a body system that controls an air-conditioner, a meter and the like, and an in-vehicle ECU of an information system that controls a car navigation system, an audio system and the like.

The sensor group 131 is a sensor group for acquiring various vehicle data. The sensor group 131 includes a global positioning system (GPS) sensor, a laser radar, an infrared sensor, an ultrasonic sensor, a raindrop sensor, an outside air temperature sensor, a vehicle interior temperature sensor, a seating sensor, a seatbelt fastening state sensor, a vehicle interior camera, a smart key sensor (a smart Key®), an intrusion monitoring sensor, a sensor for detecting tiny particles such as pollens and the like, an acceleration sensor, an electric field intensity sensor, a driver monitor, a vehicle speed sensor, a steering angle sensor, a yaw rate sensor, and a biological body sensor.

The switch group 132 is a switch group for changing over the operation of the various in-vehicle components. The switch group 132 includes a blinker lever switch, a wiper operation switch, a light operation switch, a steering switch, a navigation/audio operation switch, a window operation switch, a door/trunk opening/closing lock switch, an air-conditioner operation switch, a seat heater/ventilation switch, a seat position adjustment/preset memory switch, an intrusion monitoring system switch, a mirror operation switch, an adaptive cruise control (ACC) switch, and an engine switch.

Then, when various vehicle data are input to the control unit 110 of the agent ECU 100 from this additional ECU group 130, this sensor group 131 and this switch group 132 via the vehicle network NW, the control unit 110 of the agent ECU 100 finds out a relevant state of the vehicle with reference to the state space tables T1 and T1α that are stored in the storage unit 120. Besides, the control unit 110 of the agent ECU 100 cumulatively adds a count value of an operation history corresponding to the relevant state as the operation history RA of the in-vehicle components that is stored in the storage unit 120, every time a predetermined action is selected from the actions included in the action space through the driver's response to an operation proposal for the in-vehicle components and the operation of the in-vehicle components is performed. In this respect, the control unit 110 of the agent ECU 100 accumulates history data on the driver's response to the operation proposal for the in-vehicle components in each of the states constructing the state space.

Besides, the control unit 110 of the agent ECU 100 functions as a reinforced learning unit 111 that carries out Q-learning as a type of reinforced learning through the following procedure (step 1) to (step 7), while setting, as a reward function, the count value of the operation history of the in-vehicle components upon accepting an operation proposal, for each of the states learned as described above.

In (step 1), when a policy $\pi$ is defined as mapping from each of the states constructing the state space to each of the actions constructing the action space, the arbitrary policy $\pi$ is initially set. In (step 2), a present state st is observed (t denotes a time step). In (step 3), an action at is performed according to an arbitrary action selection method (t denotes a time step). In (step 4), a reward rt is received (t denotes a time step). In (step 5), a state s(t+1) after a state transition is observed (on the premise (so-called Markov property) that a transition to the state s(t+1) depends only on the state st and the action at that time and is unsusceptible to a previous state or a previous action). In (step 6), an action value function Q(st, at) is updated. In (step 7), the time step $\tau$ is advanced to (t+1) to make a return to (step 1).

Incidentally, it is possible to use a greedy method in which an action that maximizes the value of the action value function Q(st, at) that will be described later is invariably selected, or on the contrary, a random method in which all the actions are selected with the same probability, as the action selection method in the procedure of (step 3). In addition, it is also possible to use an $\epsilon$-greedy method in which an action is selected according to the random method with a probability $\epsilon$ and an action is selected according to the greedy method with a probability $(1-\epsilon)$, a Boltzmann selection method in which an action whose action value function Q(st, at) is high is selected with a high probability and an action whose action value function Q(st, at) is low is selected with a low probability, or the like.

Besides, the action value function Q(st, at) is updated in the procedure of (step 6), based on an expression (1) shown below.

$$Q(st,at)=(1-\alpha)Q(st,at)+\alpha(rt+\gamma \max_{at+1 \in A} Q(st+1,at+1)) \quad (1)$$

Incidentally, in the expression (1), a learning rate α is set within a numerical range of 0<α<1. This is for the purpose of making the value of the action value function Q(st, at) likely to converge by gradually reducing the amount of increase in the action value function Q(st, at) that is updated with time. Besides, by the same token, in the expression (1), Q(st, at) denotes the aforementioned action value function, and represents an expected value of a discounted cumulative reward Rt that is obtained in the case where the policy π is followed after taking the action at in the state st on the premise that the reinforced learning unit 111 adopts the certain policy π regardless of the lapse of time. It should be noted herein that the discounted cumulative reward Rt is the sum of rewards that are obtained as a state transition is repeated. The discounted cumulative reward Rt is obtained from an expression (2) shown below.

$$Rt = r_{t+1} + \gamma r_{t+2} + \gamma^2 r_{t+3} + \ldots = \sum_{k=0}^{\infty} \gamma^k r_{t+k+1} \quad (2)$$

Incidentally, in the expression (2) (as well as the expression (1)), a discount rate γ is set within a numeral range of 0<γ<1. This is for the purpose of making the value of the discounted cumulative reward Rt likely to converge by gradually reducing the reward value that is obtained with time.

Then, after that, the reinforced learning unit 111 calculates an optimal action value function Q*(st, at) that maximizes (optimizes) the action value function Q(st, at), by repeatedly carrying out the procedure of the aforementioned (step 1) to (step 7). It should be noted herein that the optimal action value function Q*(st, at) represents an expected value of the discounted cumulative reward Rt that is obtained in the case where an optimal policy π* is followed after selecting the action at in the state st when a state value function V(st) is defined as a function that represents an expected value of the discounted cumulative reward Rt that is obtained in the case where the policy π is followed in the state st and the optimal policy π* is defined as the policy π that satisfies V(st) V'(st) in all the states st.

Then, the reinforced learning unit 111 assigns the optimal action value function Q*(st, at) obtained as described above to an expression (3) shown below. Thus, a transition probability matrix that maximizes the discounted cumulative reward Rt among transition probability matrices from each of the states constructing the state space to each of the actions constructing the action space, namely, a transition probability matrix P(st, at) that matches the driver's intention while considering the count value of the operation history RA for each of the states is calculated.

$$P(st, at) = (e^{Q^*(st,at)/T}) / \sum_{at' \in A} e^{Q(st,at')/T} \quad (3)$$

FIG. 8 shows an example of the transition probability matrix P (st, at) that is calculated as described above. Each line of the transition probability matrix P(st, at) corresponds to each of the states constructing the state space, and each column of the transition probability matrix P(st, at) corresponds to each of the actions constructing the action space. Moreover, in the example shown in the drawing, for example, the probability of taking an action a1 in a state s1 is "0.01". By the same token, the probability of taking an action a2 in the state s1 is "0.10". By the same token, the probability of taking an action a100 in the state s1 is "0.03".

Then, the control unit 110 of the agent ECU 100 calculates an information entropy H(s) while using expressions shown in FIG. 8 when these probabilities are denoted by p. Incidentally, the information entropy H(s) is a parameter that serves as an index of the dispersion degree of a probability distribution. In this respect, the control unit 110 of the agent ECU 100 also functions as a dispersion degree computation unit 112 that computes a dispersion degree of a probability distribution that is calculated by the reinforced learning unit 111. Then, it is meant that as the value of the information entropy H(s) increases, the dispersion degree of the probability distribution increases, namely, the degree of homogeneity of the distribution of the probabilities of taking the respective actions constructing the action space in the state st increases. Therefore, in the case where the value of the information entropy H(s) is large, it is difficult to predict an action that can be taken by the driver from the actions constructing the action space.

Besides, the dispersion degree computation unit 112 calculates an average entropy H(Ω) by summating the information entropies H(s) calculated as to the respective states constructing the state space, as indicated by an expression (4) shown below.

$$H(\Omega)=(\Sigma_i^N H(S_i))/N(i=1,2,\ldots N) \quad (4)$$

Incidentally, the average entropy H(Ω) is a parameter indicating the dispersion degree of the state space. Then, it is meant that as the value of the average entropy H(Ω) increases, the dispersion degree of the state space increases, namely, the degree of homogeneity of probabilities of taking the respective actions constructing the action space in each of the states when the state space is viewed as a whole increases. Therefore, the value of the average entropy H(Ω) is an index indicating whether or not it is possible to predict an action that can be taken by the driver from the actions constructing the action space as to services as targets of the operation proposal.

Thus, the control unit 110 of the agent ECU 100 also functions as a proposed information generation unit 113 that generates information on the operation proposal for the in-vehicle components while using the ϵ-greedy method in which the average entropy H(Ω) obtained by the reinforced learning unit 111 is used as an ϵ-value, according to an algorithm shown below. The proposed information generation unit also functions as an information provision unit.

$$\varepsilon = H(\Omega) \quad (5)$$
$$\delta = rand(1)$$
if $\delta > \varepsilon$
$$\pi(S) \in \underset{at \in A}{\mathrm{argmax}} Q(st, at)$$

$$\text{else } \delta \le \varepsilon \quad (6)$$
$$\tau = rand(2)$$
$$\pi(S) \in F(S) = \sum_{a/\in A}^{\Omega A} P(st, at) = \tau$$

Incidentally, in the aforementioned algorithm, the proposed information generation unit 113 sets a random number δ (a threshold) that assumes a numerical range of 0 to 1, and applies the expression (5) when a condition "δ>ε" is satisfied. That is, the proposed information generation unit 113 enhances the frequency of applying the expression (5) as the value of the average entropy H(Ω) obtained by the reinforced learning unit 111 decreases. Then, the proposed information generation unit 113 outputs, as a target of an operation proposal, the action a that maximizes the optimal action value function Q*(st, at) obtained by the reinforced learning unit 111 as described above, namely, the most valuable action in the state s, through application of the expression (5), and makes a definitive operation proposal.

On the other hand, in the aforementioned algorithm, the proposed information generation unit 113 applies the expression (6) when a condition "δ≤ε" is satisfied. That is, the proposed information generation unit 113 enhances the frequency of applying the expression (6) as the value of the average entropy H(Ω) obtained by the reinforced learning unit 111 increases. In applying the expression (6), the proposed information generation unit 113 first obtains a cumulative distribution function F(s) by adding probabilities of taking the respective actions constructing the action space in a certain state s. Then, when a random number τ that assumes a numerical range of 0 to 1 is set as a variable different from the aforementioned random number δ, the proposed information generation unit 113 makes a trial-and-error operation proposal to output, as a target of the operation proposal, an action that satisfies a condition "F(s)=τ".

As is apparent also from the cumulative distribution function F(s) shown in FIG. 9 as an example, the amount of increase in the cumulative distribution function F(s) also fluctuates in accordance with the probability of taking each of the actions constructing the action space. In concrete terms, the amount of the cumulative distribution function F(s) sharply increases in a section along the axis of abscissa that corresponds to actions with relatively high probability, whereas the amount of the cumulative distribution function F(s) also gently increases in a section along the axis of abscissa that corresponds to actions with relatively low probability. Therefore, when the random number τ is changed within the numerical range of 0 to 1, the actions with relatively high probability are more likely to satisfy the condition "F(s)=τ", and the actions with relatively low probability are less likely to satisfy the condition "F(s)=τ". Accordingly, as described above, when each of the actions satisfying the condition "F(s)=τ" is output as a target of the operation proposal, this action is output with such a tendency as to enhance the frequency of selecting this action as the probability thereof rises. Incidentally, in the example shown in the drawing, the corresponding action at the time when the condition F(s)=τ is satisfied is an action a3'. Therefore, the action a3' is selected as a target action of the operation proposal from the plurality of the actions constructing the action space, and is output.

Figures 10A, 10B:
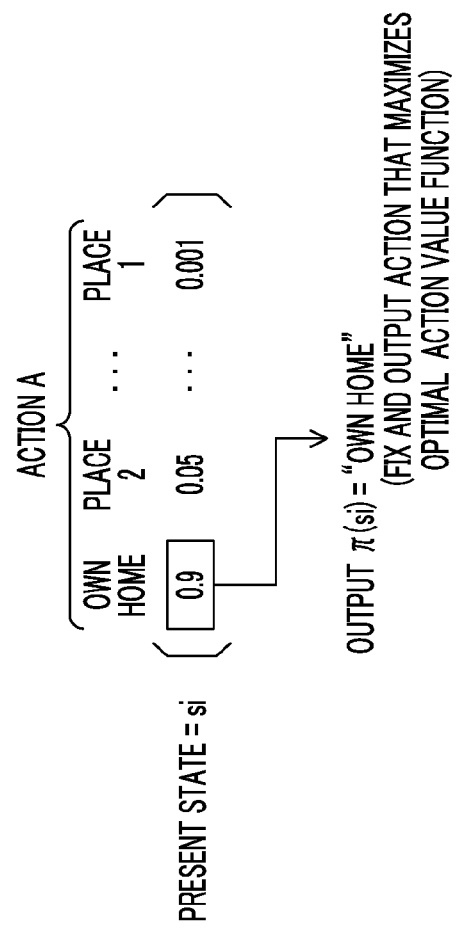
FIG. 10A is a view showing an example of attributes of vehicle data that define a current state.
FIG. 10B is a view for illustrating a process of selecting an action that is used for a definitive operational proposal in the state shown in FIG. 10A.

FIGS. 10A and 10B show concrete examples for illustrating selection of a definitive operation proposal or a trial-and-error operation proposal through the use of the ε-greedy method in setting a destination as the operation proposal.

In this example, as shown in FIG. 10A, the agent ECU 100 first extracts that one of the respective states constructing the state space in the state space table T1 which is relevant to the present state (extracts this state as a state Si in the drawing), based on various vehicle data that are acquired through the vehicle network NW. Then, in this example, there is a situation where the average entropy H(Ω) that is obtained from the transition probability matrix P(st, at) is relatively high, and the frequency of making a definitive operation proposal to which the above-mentioned expression (5) is applied is high. In this case, as shown in FIG. 10B, the agent ECU 100 outputs, as a target of the operation proposal, the most valuable action in the present state ("own home" in the example shown in the drawing) among the respective actions constructing the action space.

Besides, FIGS. 11A and 11B show a concrete example for illustrating selection of a definitive operation proposal or a trial-and-error operation proposal through the use of the ε-greedy method, in reproducing a sound as the operation proposal.

In this example as well, as shown in FIG. 11A, the agent ECU 100 first extracts that one of the respective states constructing the state space in the state space table T1α which is relevant to the present state (extracts this state as a state Sj in the drawing), based on various vehicle data that are acquired through the vehicle network NW. Then, in this example, there is a situation where the average entropy H(Ω) that is obtained from the transition probability matrix P(st, at) is relatively low, and the frequency of making a trial-and-error operation proposal to which the above-mentioned expression (6) is applied is high. In this case, as shown in FIG. 11B, the agent ECU 100 randomly outputs each of the actions constructing the action space as a target of the operation proposal, with such a tendency as to enhance the frequency of selecting the action as the probability density of a transition probability of the action from the present state rises ("FMD" in the example shown in the drawing).

Then, the agent ECU 100 makes an operation proposal for the in-vehicle components through a sound or an image, by transmitting information on the action thus output as a target of the operation proposal to a sound output unit 140 such as a speaker or the like or an image output unit 141 such as an liquid crystal display (an LCD), a head-up display (an HUD) or the like via the vehicle network NW.

Besides, the agent ECU 100 also functions as an operation detection unit 114 that detects a response, from the driver, to an operation proposal by receiving, via the vehicle network NW, an operation signal of an operation input or a sound input via an operation input unit 142 such as a steering switch, a microphone or the like.

Figure 12:
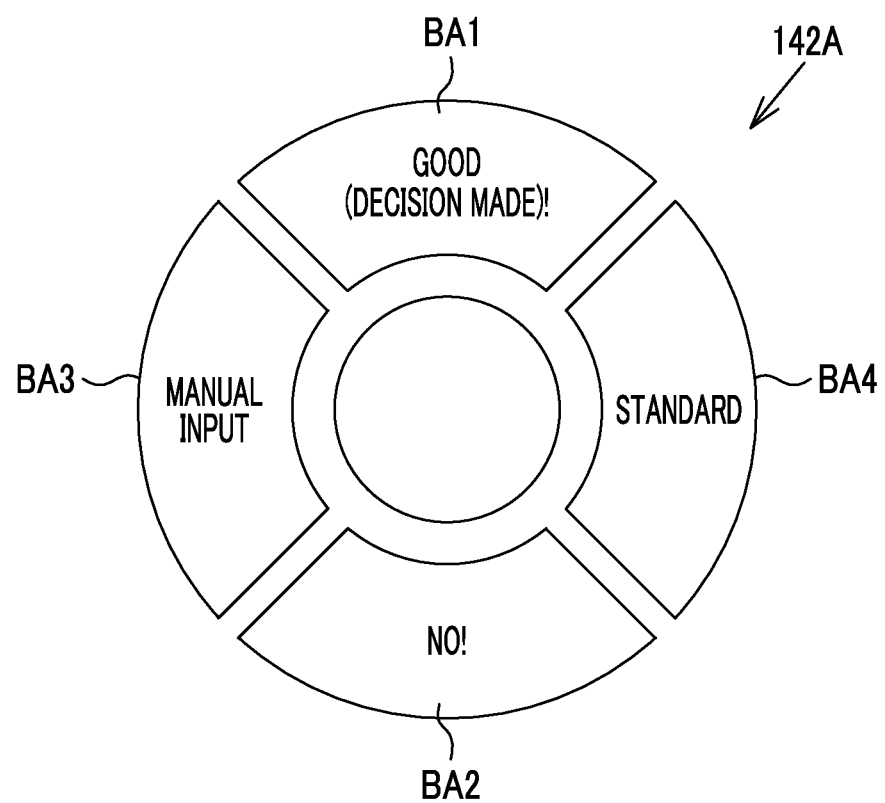
FIG. 12 is a view showing an example of a steering switch.

FIG. 12 is a view for illustrating an example of an operation input via the steering switch. In the example shown in the drawing, a steering switch 142A has four operation buttons BA1 to BA4. Among these operation buttons, the first operation button BA1 that is located above and the second operation button BA2 that is located below are allocated as operation buttons that are operated in responding to an operation proposal from the agent ECU 100. Then, the first operation button BA1 is operated in accepting the operation proposal, and the second operation button BA2 is operated in, on the contrary, rejecting the operation proposal. Besides, among these operation buttons, the third operation button BA3 that is located on the left and the fourth operation button BA4 that is located on the right are allocated as operation buttons that are operated in operating the in-vehicle components independently of an operation proposal from the agent ECU 100. Then, the third operation button BA3 is operated when the driver himself or herself operates the in-vehicle components through manual input, and the fourth operation button BA4 is operated when the driver himself or herself operates the in-vehicle components with high frequency independently of the state of the vehicle on each occasion. Incidentally, the fourth operation button BA4 may be allocated as an operation button that is operated when information on the operation of the in-vehicle components performed in the past by another driver in the same situation as now is acquired from an external server and provided to the driver himself or herself.

Then, upon detecting an operation signal through the operation detection unit 114, the control unit 110 of the agent ECU 100 promotes the transmission of a trigger signal from a learning update trigger unit 115 to the reinforced learning unit 111. Incidentally, in the present embodiment as described above, the count value of the operation history of the in-vehicle components at the time of acceptance of an operation proposal is set as a reward function in reinforced learning. Therefore, if the steering switch 142A shown in FIG. 12 is mentioned as an example, the transmission of a trigger signal from the learning update trigger unit 115 to the reinforced learning unit 111 is promoted when the first operation button BA1 is operated to accept an operation proposal.

Then, upon receiving the trigger signal from the learning update trigger unit 115, the reinforced learning unit 111 finds out which one of the states constructing the state space in each of the state space tables T1 and T1α is relevant to the present state, based on various vehicle data that are acquired through the vehicle network NW at that time point. Then, the reinforced learning unit 111 cumulatively adds the count value of the operation history corresponding to the relevant state, in the operation history RA of the in-vehicle components that is stored in the storage unit 120.

Besides, upon updating the operation history RA of the in-vehicle components, the reinforced learning unit 111 newly calculates the optimal action value function Q*(st, at) and the transition probability matrix P(st, at) based on the optimal action value function Q*(st, at) while using a post-update reward function that coincides with the update of the operation history RA. Then, the proposed information generation unit 113 makes an operation proposal for the in-vehicle components that matches the driver's intention, based on the transition probability matrix P(st, at) newly calculated by the reinforced learning unit 111.

Next, a concrete processing procedure of an operation proposal process of the in-vehicle components that is performed by the agent ECU 100 according to the present embodiment after reading out the information provision program stored in the storage unit 120 will be described. It should be noted herein that the agent ECU 100 starts an operation proposal process for the in-vehicle components shown in FIG. 13 on the condition that an ignition switch of the vehicle be turned on.

Figure 13:
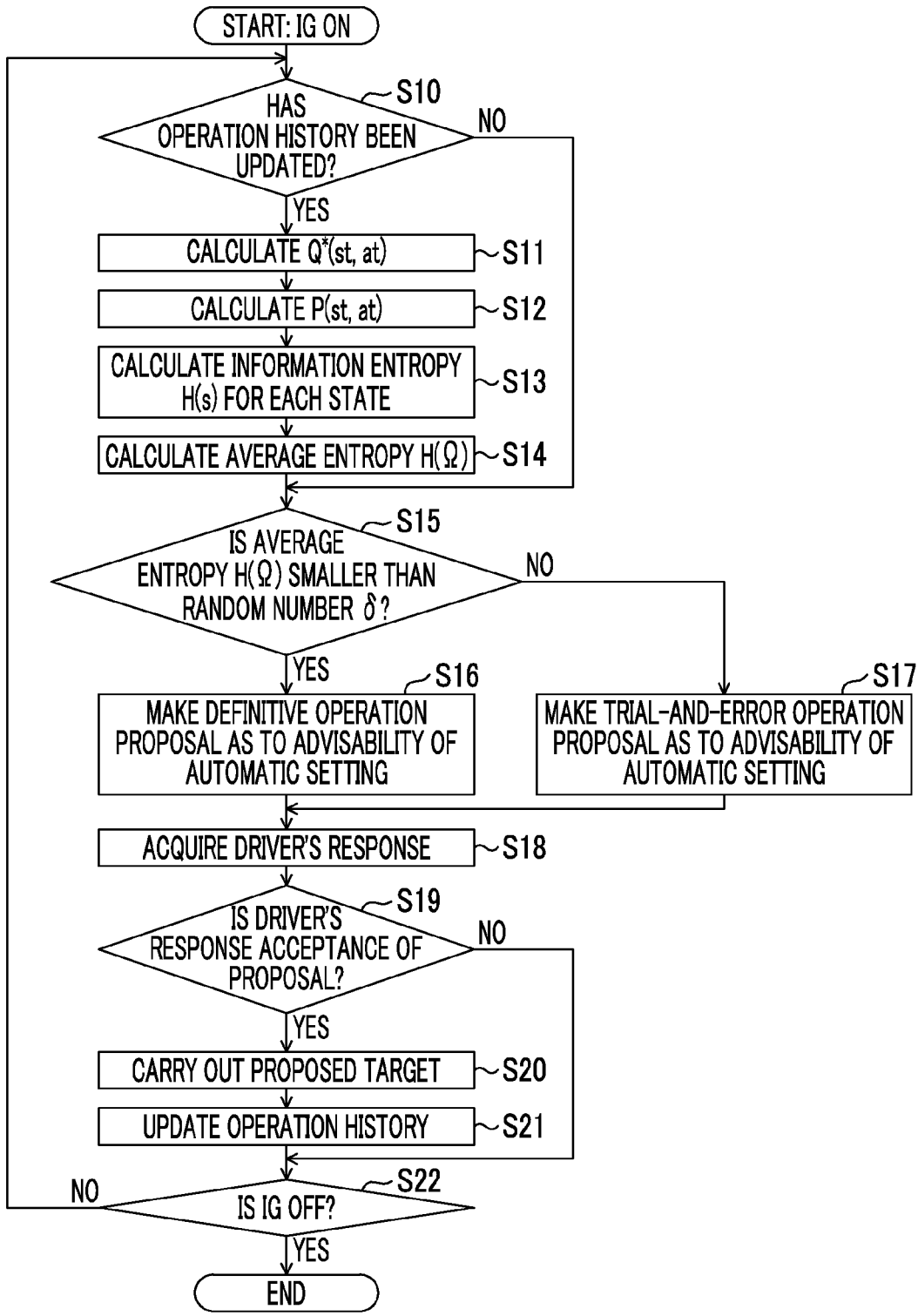
FIG. 13 is a flowchart showing processing contents of an operational proposal process of in-vehicle components as an example of an information provision process.

As shown in FIG. 13, in this operation proposal process for the in-vehicle components, the agent ECU 100 first determines whether or not the operation history RA that is stored in the storage unit 120 has been updated, namely, determines whether or not a trigger signal has been transmitted from the learning update trigger unit 115 to the reinforced learning unit 111 (step S10).

Then, if the operation history RA is updated (YES in step S10), the reward function is also updated, so the agent ECU 100 calculates the optimal action value function Q*(st, at) through the reinforced learning unit 111 while using the post-update reward function (step S11).

Besides, the agent ECU 100 calculates the transition probability matrix P(st, at) from each of the states constructing the state space to each of the actions constructing the action space through the reinforced learning unit 111, based on the optimal action value function Q*(st, at) thus calculated (step S12).

Besides, the agent ECU 100 calculates the information entropy H(s) for each of the states constructing the state space through the dispersion degree computation unit 112, based on the transition probability matrix P(st, at) thus calculated (step S13). Furthermore, the agent ECU 100 calculates the average entropy H(Ω) that is obtained by summating the information entropies H(s) for the respective states, through the dispersion degree computation unit 112 (step S14).

Then, if the average entropy H(Ω) thus calculated is smaller than the random number δ set as a random number (YES in step S15), the agent ECU 100 makes a definitive operation proposal to fix, as a target of automatic setting, the action a that maximizes the optimal action value function Q*(st, at) calculated in the foregoing step S11, and output the action a from the proposed information generation unit 113 to the sound output unit 140 or the image output unit 141 (step S16).

On the other hand, if the average entropy H(Ω) calculated in the foregoing step S14 is equal to or larger than the random number δ (NO in step S15), the agent ECU 100 makes a trial-and-error operation proposal to randomly output an action as a target of automatic setting, with such a tendency as to enhance the frequency of selecting the action as the probability of performance of this action in the present state st rises, based on the transition probability matrix P(st, at) calculated in the foregoing step S12 (step S17).

Subsequently, when there is a response, from the driver, to the operation proposal in the foregoing step S16 or the foregoing step S17, the agent ECU 100 acquires information on the response through the operation input unit 142 (step S18). Then, the agent ECU 100 determines whether or not the response from the driver thus acquired accepts the operation proposal (step S19). This determination is made depending on, for example, whether or not a decision-making button (the first operation button BA1 in the example shown in FIG. 12) has been pressed in the case of an operation input via the steering switch, or whether or not a word meaning an affirmative response (e.g., "Yes" or the like) has been input in the case of a sound input via the microphone.

Then, if the response from the driver accepts the operation proposal (YES in step S19), the agent ECU 100 performs the action output as the target of automatic setting in the foregoing step S16 or step S17 (step S20). Besides, as the action output as the target of automatic setting is performed, the agent ECU 100 transmits a trigger signal from the learning update trigger unit 115 to the reinforced learning unit 111, updates the operation history RA of the in-vehicle components through the reinforced learning unit 111 (step S21), and shifts the process to step S22.

On the other hand, if the response from the driver does not accept the operation proposal (NO in step S19), the agent ECU 100 shifts the process to step S22 without passing through the processing contents of the foregoing step S20 and step S21.

Then, while the ignition switch of the vehicle is on (NO in step S22), the agent ECU 100 returns the process to step S10, and repeats the processing contents of step S10 to step S22 on a predetermined cycle. At this time, if the operation history RA of the in-vehicle components has been updated in the foregoing step S21, the agent ECU 100 newly calculates the optimal action value function Q*(st, at) and the transition probability matrix P(st, at) based on the optimal action value function Q*(st, at) while using the post-update reward function that coincides with the update of the operation history RA (step S11 and step S12). Then, the agent ECU 100 makes the above-mentioned definitive operation proposal or the above-mentioned trial-and-error operation proposal as the operation proposal for the in-vehicle components, based on the newly calculated transition probability matrix P(st, at) (step S16 and step S17).

After that, every time the operation input unit 142 is operated as a response to the operation proposal to accept the operation proposal, the agent ECU 100 updates the operation history RA of the in-vehicle components, and repeats reinforced learning by the reinforced learning unit 111 in accordance with the update. Thus, as the frequency of the response, from the driver, to the operation proposal for the in-vehicle components increases, the accuracy of the transition probability matrix P (st, at) is enhanced in such a manner as to suit the actual actions performed by the driver as an individual.

Next, the operation of the agent ECU 100 according to the present embodiment will be described hereinafter, especially focusing on the operation in making an operation proposal for the in-vehicle components. In making an operation proposal for the in-vehicle components, the difficulty in predicting in advance an action that can be taken by the driver in accordance with the state of the vehicle on each occasion usually differs depending on the type of the operation proposal as a target. For example, the reproduction of a sound at the time of the running of the vehicle, for example, the turning-on of a radio, the playback of a song or the like, is generally susceptible to the driver's state of mind at that time and the like as well as the state of the vehicle, and there are a variety of options as well. Therefore, it is estimated to be difficult to predict in advance an action that can be taken by the driver. On the other hand, for example, the setting of a destination or the like makes it generally easier to limit the number of options from the state of the vehicle on each occasion than the reproduction of a sound, and it is estimated to be easy to predict in advance an action that can be taken by the driver.

Thus, in the present embodiment, the agent ECU 100 records, as a log, the operation history RA of the in-vehicle components as a response to the operation proposal, individually for the type of each operation proposal, and carries out reinforced learning in which the recorded operation history RA is set as a reward function. Thus, the agent ECU 100 calculates the transition probability matrix P(st, at) from each of the states constructing the state space to each of the actions constructing the action space in such a manner as to suit the actual action performed by the driver as an individual.

In this case, as described above, in the transition probability matrix P(st, at) that is calculated based on the operation history RA of the in-vehicle components corresponding to the reproduction of a sound, the probability of taking each of the actions constructing the action space in each of the states constructing the state space is relatively likely to be dispersed. On the other hand, in this case as well as described above, in the transition probability matrix P(st, at) that is calculated based on the operation history RA of the in-vehicle components corresponding to the setting of a destination, the probability of taking each of the actions constructing the action space in each of the states constructing the state space is relatively unlikely to be dispersed.

Thus, in the present embodiment, the agent ECU 100 evaluates the dispersion degree of this state space, based on the value of the average entropy H($\Omega$) that is obtained by summating the values of the information entropy H(s) for the respective states constructing the state space.

Then, when the average entropy H ($\Omega$) is smaller than the random number δ, the agent ECU 100 makes a definitive operation proposal to fix the most valuable action in the present state as a target of the operation proposal and output this action. In this case, the agent ECU 100 enhances the frequency of making a definitive operation proposal as the value of the average entropy H($\Omega$) decreases.

FIG. 14 shows an example of the contents of a conversation that is held between the agent ECU 100 and the driver in such a manner as to include a definitive operation proposal. In the example shown in the drawing, the agent ECU 100 confirms whether or not the destination as a target of automatic setting is "own home", as a definitive operation proposal. Then, when a sound command indicating the acceptance of the definitive operation proposal ("Yes" in the example shown in the drawing) is input from the driver, the agent ECU 100 automatically sets "own home" as a destination. As described hitherto, the agent ECU 100 makes an operation proposal for the in-vehicle components that matches the driver's intention, without bothering the driver to select an action, in a situation where it is easy to specify which one of the actions constructing the action space will be taken by the driver in the present state as in the case of, for example, the setting of a destination.

On the other hand, when the average entropy H ($\Omega$) is equal to or larger than the random number δ, the agent ECU 100 makes a trial-and-error operation proposal to output, as a target of the operation proposal, an action randomly selected with such a tendency as to enhance the frequency of selecting the action as the probability density of the transition probability of the action from the present state rises. In this case, the agent ECU 100 enhances the frequency of making a trial-and-error operation proposal as the value of the average entropy H($\Omega$) increases.

FIG. 15 shows an example of the contents of a conversation that is held between the agent ECU 100 and the driver in such a manner as to include a trial-and-error operation proposal. In the example shown in the drawing, the agent ECU 100 first asks the driver to confirm whether to start a trial-and-error operation proposal or not. Then, when a sound command indicating the acceptance of the trial-and-error operation proposal ("Yes" in the example shown in the drawing) is input from the driver, the agent ECU 100 proposes that the driver select "FMA" as an action randomly selected from the actions whose probability density of the transition probability from the present state is relatively high. Then, when a sound command indicating acceptance of a proposed sound is input to the agent ECU 100 from the driver, the agent ECU 100 automatically sets "FMA" as the sound. Besides, when a sound command indicating rejection of the proposed sound ("No" in the example shown in the drawing) is input to the agent ECU 100 after reproduction of the sound, the agent ECU 100 proposes that the driver select "song n on CD" as another action randomly selected with such a tendency as to enhance the frequency of selecting the action as the probability density of the above-mentioned transition probability of the action rises. Then, until the sound command indicating acceptance of the proposed sound is input to the agent ECU 100 from the driver, the agent ECU 100 sequentially proposes another randomly selected action to the driver with such a tendency as to enhance the frequency of selecting the action as the probability density of the transition probability thereof rises. Then, when the proposal to select "song 2 on CD" is accepted, the agent ECU 100 automatically sets "song 2 on CD" as the sound. In this manner, in a situation where it is difficult to specify which one of the actions constructing the action space will be taken by the driver in the present state as in the case of, for example, the setting of a sound, the agent ECU 100 more adequately makes an operation proposal for the in-vehicle components that matches the driver's intention, by selecting a target action from a plurality of candidates and outputting this target action.

As described above, according to the present embodiment, the following effects can be obtained. (1) When the average entropy H(Ω) obtained from the summated value of the information entropies H(s) for the respective states in the transition probability matrix P(st, at) calculated through reinforced learning is smaller than the random number δ, the agent ECU 100 makes a definitive operation proposal to fix a target action as a target of the operation proposal and output this target action. Thus, the operation proposal for the in-vehicle components that matches the driver's intention is made without bothering the driver to select an action. On the other hand, when the average entropy H(Ω) obtained from the summated value of the information entropies H(s) for the respective states in the transition probability matrix P(st, at) calculated through reinforced learning is equal to or larger than the random number δ, the agent ECU 100 makes a trial-and-error operation proposal to select a target action as a target of the operation proposal from a plurality of candidates and output this target action. Thus, the operation proposal for the in-vehicle components that matches the driver's intention is more adequately made. That is, only a single content of the operation of the in-vehicle components is output at a time as a target of the operation proposal regardless of whether the average entropy H(Ω) is large or small. Therefore, the driver has only to express his or her will, that is, whether to agree to the content of the operation of the in-vehicle components that is proposed on each occasion. Therefore, responses to different types of operation proposals for the in-vehicle components whose dispersion degrees of the average entropy H(Ω) are different from one another, such as the setting of a destination and the reproduction of a sound, can be consistently made while using the operation input unit 142 as the same simple user interface. Thus, the operation proposal for the in-vehicle components that matches the driver's intention can be made while restraining the driver from being burdened.

(2) When the value of the average entropy H (Ω) is smaller than the random number δ, the agent ECU 100 makes a definitive operation proposal targeting an action that maximizes the optimal action value function Q*(st, at) in the present state, namely, an action that is most valuable in the present state and that is assumed to be most likely to be taken by the driver. Thus, the operation proposal that matches the driver's intention can be realized with higher reliability.

(3) When the value of the average entropy H (Ω) is equal to or larger than the random number δ, the agent ECU 100 makes a trial-and-error operation proposal with such a tendency as to enhance the frequency of selecting, as a target, an action whose probability density of the probability distribution in the present state is high, namely, an action that is likely to be taken by the driver in the present state. Thus, even under the circumstances where it is difficult to specify the operation of the target in-vehicle components in advance, an operation proposal that matches the driver's intention can be realized with higher reliability.

(4) The agent ECU 100 selects a definitive operation proposal or a trial-and-error operation proposal with such a tendency as to enhance the frequency of making a trial-and-error operation proposal as the ϵ-value increases, while using the ϵ-greedy method in which the value of the average entropy H(Ω) is set as the ϵ-value. Therefore, in the agent ECU 100, the frequency of selecting a trial-and-error operation proposal rises as the ϵ-value as the value of the average entropy increases, namely, as the dispersion degree of the state space increases. In this manner as well, under the circumstances where it is difficult to specify an action of the driver as to the provision of information as a target, the operation proposal that matches the driver's intention can be realized with higher reliability.

(5) The agent ECU 100 sets a reward function by applying the frequency of an action that is performed after being selected from the actions constructing the action space through a response to an operation proposal, as an index of an appropriateness degree of the operation proposal for the in-vehicle components as to the driver's intention, and also updates the reward function every time a response history (the operation history RA of the in-vehicle components) is updated. Thus, the transition probability matrix P(st, at) in which each of the actions constructing the action space is performed in each of the states constructing the state space in such a manner as to match the driver's intention can be calculated, and the accuracy of the transition probability matrix P(st, at) can be enhanced in such a manner as to suit the actual response by the driver as an individual as the frequency of the driver's response increases.

(6) The agent ECU 100 defines each of the states constructing the state space while considering a variety of elements that influence the operation proposal for the in-vehicle components, such as the operation situations DA and DAα of the in-vehicle components, the characteristics DB and DBα of the passenger(s) of the vehicle, the running situations DC and DCα of the vehicle, and the like. Thus, the operation proposal that matches the driver's intention can be realized in such a manner as to further suit the actual circumstances. Incidentally, the number of states constructing the state space is also estimated to be enormous, as a result of taking various elements into account as described above. In this respect, according to the aforementioned embodiment, the operation proposal that matches the driver's intention can be realized even when an enormous number of teacher data are not prepared in advance as is the case with the use of, for example, teacher-assisted learning, by using the method of reinforced learning in which an attempt is made to enhance the accuracy as the operation history RA is accumulated.

Second Embodiment

Next, an information provision device according to the second embodiment will be described with reference to the drawings. Incidentally, the second embodiment is different from the first embodiment in that a definitive operation proposal or a trial-and-error operation proposal is selected based on a value of an information entropy corresponding to the present state instead of obtaining a value of an average entropy as the sum of values of information entropies for the respective states. Accordingly, in the following description, the configurational details that are different from those of the first embodiment will be mainly described, and redundant description of the configurational details that are identical or equivalent to those of the first embodiment will be omitted.

FIG. 16 shows an example of the transition probability matrix P(st, at) that is used to select a definitive operation proposal or a trial-and-error operation proposal in the present embodiment. In the example shown in the drawing, for example, the probability of taking the action a1 in a state si is "0.03". By the same token, the probability of taking the action a2 in the state si is "0.04". By the same token, the probability of taking the action a100 in the state si is "0.02".

Moreover, the agent ECU 100 calculates the value of the information entropy H(s) while using the expressions shown in FIG. 8, when these probabilities are denoted by p. In this case, these probabilities are homogeneously dispersed, so the value of the information entropy H(s) is relatively large.

Besides, by the same token, in the example shown in the drawing, for example, the probability of taking the action a1 in a state sj is "0.6". By the same token, the probability of taking the action a2 in the state sj is "0.02". By the same token, the probability of taking the action a100 is "0.04". Moreover, the agent ECU 100 calculates the value of the information entropy H(s) while using the expressions shown in FIG. 8, when these probabilities are denoted by p. In this case, these probabilities are locally ("the action a1") biased, so the value of the information entropy H(s) is relatively small.

Then, the agent ECU 100 generates information on an operation proposal for the in-vehicle components, while using the ϵ-greedy method in which the value of the information entropy H(s) corresponding to the present state is the ϵ-value, generally in accordance with the algorithm used in the aforementioned first embodiment. Thus, when the value of the information entropy H(s) corresponding to the present state is relatively large as in the case where the present state is the state si shown in FIG. 16, the agent ECU 100 enhances the frequency of making a trial-and-error operation proposal through application of the above-mentioned expression (6). On the other hand, when the value of the information entropy H(s) corresponding to the present state is relatively small as in the case where the present state is the state sj shown in FIG. 16, the agent ECU 100 enhances the frequency of making a definitive operation proposal through application of the above-mentioned expression (5). That is, even in the case where the value of the average entropy H(Ω) is relatively small when the state space is viewed as a whole as in the case of, for example, the setting of a destination, the agent ECU 100 determines that there is a situation where it is difficult to specify which one of the actions constructing the action space will be taken by the driver exclusively in the present state, and makes a trial-and-error operation proposal, if the value of the information entropy H(s) corresponding to the present state is equal to or larger than the random number δ. Besides, on the contrary, even in the case where the value of the average entropy H(Ω) is relatively large when the state space is viewed as a whole as in the case of, for example, the setting of a sound, the agent ECU 100 determines that there is a situation where it is easy to specify which one of the actions constructing the action space will be taken by the driver exclusively in the present state, and makes a definitive operation proposal, if the value of the information entropy H(s) corresponding to the present state is smaller than the random number δ. As described hitherto, the agent ECU 100 makes an operation proposal for the in-vehicle components that matches the driver's intention in such a manner as to further suit the actual circumstances, by individually and concretely considering the ease with which the driver's action is specified in the present state.

As described above, according to the aforementioned second embodiment, the following effects can be obtained in addition to the aforementioned effect (1) of the first embodiment. (1A) When the information entropy H(s) corresponding to the present state is equal to or larger than the random number δ in the transition probability matrix P(st, at) calculated through reinforced learning, the agent ECU 100 makes a trial-and-error operation proposal to select a target action from a plurality of candidates and output this target action, as an operation proposal for the in-vehicle components. Thus, the operation proposal for the in-vehicle components that matches the driver's intention is more adequately made. On the other hand, when the information entropy H(s) corresponding to the present state is smaller than the random number δ in the transition probability matrix P(st, at) calculated through reinforced learning, the agent ECU 100 makes a definitive operation proposal to fix and output a target action, as an operation proposal for the in-vehicle components. Thus, the operation proposal for the in-vehicle components that matches the driver's intention is made without bothering the driver to select an action. That is, only a single content of the operation of the in-vehicle components is output at a time as a target of the operation proposal, regardless of whether the dispersion degree of the information entropy H(s) for each of the states is large or small. Therefore, the driver has only to express his or her will, namely, whether to agree to the content of the operation of the in-vehicle components that is proposed on each occasion or not. Therefore, responses to different types of operation proposals for the in-vehicle components whose dispersion degrees of the information entropy H(s) for each of the states are different from one another, such as the setting of a destination and the reproduction of a sound, can be made while using the operation input unit 142 as the same simple user interface. Thus, the operation proposal for the in-vehicle components that matches the driver's intention can be made while restraining the driver from being burdened. Besides, the agent ECU 100 selects a trial-and-error operation proposal or a definitive operation proposal based on the value of the information entropy H(s) corresponding to the present state, regardless of the value of the average entropy H(Ω) that defines the dispersion degree of the state space at the time when the state space is viewed as a whole. Thus, the agent ECU 100 can make an operation proposal for the in-vehicle components that matches the driver's intention in such a manner as to further suit the actual circumstances, by individually and concretely considering the ease with which the driver's action is specified in the present state.

Other Embodiments

Incidentally, each of the aforementioned embodiments can also be carried out in the following modes. In the aforementioned first embodiment, the average entropy H(Ω) that defines the dispersion degree of the state space is calculated by summating the information entropies H(s) as to all the states that define the state space. Instead of this, the average entropy H(Ω) may be calculated by summating the information entropies H(s) as to some of the states that define the state space.

In the aforementioned first embodiment, the random number δ is used as the threshold to be compared with the average entropy H(Ω). Thus, a wider variety of allocations are made possible. Instead of this, however, with a view to alleviating the processing load, a fixed value may be used as the threshold to be compared with the average entropy H(Ω). In this case, a definitive operation proposal may be made through application of the above-mentioned expression (5) when the average entropy H(Ω) is smaller than the fixed value, whereas a trial-and-error operation proposal may be made through application of the above-mentioned expression (6) when the average entropy H(Ω) is equal to or larger than the fixed value.

By the same token, in the aforementioned second embodiment, the random number δ is used as the threshold to be compared with the information entropy H(s) corresponding to the present state. Instead of this, a fixed value may be used as the threshold to be compared with the information entropy H(s) corresponding to the present state. In this case, a definitive operation proposal may be made through application of the above-mentioned expression (5) when the information entropy H(s) is smaller than the fixed value, whereas a trial-and-error operation proposal may be made through application of the above-mentioned expression (6) when the information entropy H(s) corresponding to the present state is equal to or larger than the fixed value.

In the aforementioned first embodiment, the dispersion degree of the state space is evaluated based on the average entropy H($\Omega$) obtained by summating the information entropies H(s) corresponding to the respective states constructing the state space. Instead of this, the dispersion degree of the state space may be evaluated based on the value obtained by summating variances or standard deviations of probability distributions for the respective states constructing the state space.

By the same token, in the aforementioned second embodiment, the dispersion degree of the probability distribution in the present state is evaluated based on the information entropy H(s) corresponding to the present state. Instead of this, however, the dispersion degree of the probability distribution in the present state may be evaluated based on the variance or standard deviation of probability distribution in the present state.

In each of the aforementioned embodiments, the attributes of the vehicle data that define the states include the operation situations DA and DA$\alpha$ of the in-vehicle components, the characteristics DB and DB$\alpha$ of the passenger(s) of the vehicle, and the running situations DC and DC$\alpha$ of the vehicle. The disclosure is not limited to this. Other elements may be adopted as the attributes of the vehicle data that define the states, as long as the elements contribute to the manner in which the driver operates the in-vehicle components.

In each of the aforementioned embodiments, as a definitive operation proposal, the action that maximizes the optimal action value function Q*(st, at) in the present state among the respective actions constructing the action space, namely, the most valuable action in the present state is output as a target of the operation proposal. Instead of this, for example, the action that maximizes the transition probability in the present state may be output as a target of the operation proposal. In short, it is sufficient to make a definitive operation proposal targeting the action that is assumed to be most likely to be taken by the driver.

In each of the aforementioned embodiments, as a trial-and-error operation proposal, the action that satisfies the condition "F(s)=$\tau$" is output as a target of the operation proposal. Instead of this, when the cumulative distribution function F(s) is obtained by permutating the probabilities of taking the respective actions constructing the action space in the certain state s in ascending order and adding these probabilities, the action that satisfies a condition "F(s)$\geq$$\tau$" may be output as a target of the operation proposal. Besides, when the cumulative distribution function F(s) is obtained by permutating the probabilities of taking the respective actions constructing the action space in the certain state s in descending order and adding these probabilities, the action that satisfies a condition "F(s)$\leq$$\tau$" may be output as a target of the operation proposal. In short, it is sufficient to make a trial-and-error operation proposal with such a tendency as to enhance the frequency of selecting an action as the probability density of the probability distribution of the action in the present state rises.

In each of the aforementioned embodiments, the number of times of operation of the first operation button BA1 in the steering switch 142A shown in FIG. 12 as a response to an operation proposal is set as the reward function in reinforced learning. Instead of this, a value obtained by subtracting the number of times of operation of the second operation button BA2 from the number of times of operation of the first operation button BA1 in the steering switch shown in FIG. 12 may be set as the reward function in reinforced learning. Besides, a value obtained by further subtracting the number of times of operation of the third operation button BA3 or the number of times of operation of the fourth operation button BA4 from the number of times of operation of the first operation button BA1 can also be set as the reward function in reinforced learning. Besides, a value obtained by recording, as a log, the number of times of absence of the driver's operation in response to an operation proposal for the in-vehicle components and subtracting this number recorded as the log from the number of times of operation of the first operation button BA1 can also be set as the reward function in reinforced learning. Besides, the number of times of development of comfortable and uncomfortable feelings by the driver for an operation proposal for the in-vehicle components may be measured based on a biological signal or the like of the driver, and the number of times of development of a comfortable feeling by the driver may be set as the reward function in reinforced learning. Besides, a value obtained by subtracting the number of times of development of an uncomfortable feeling by the driver from the number of times of development of a comfortable feeling by the driver can also be set as the reward function in reinforced learning. In short, any index representing the appropriateness degree of an operation proposal for the in-vehicle components with respect to the driver's intention can be set as the reward function in reinforced learning.

Figure 17:
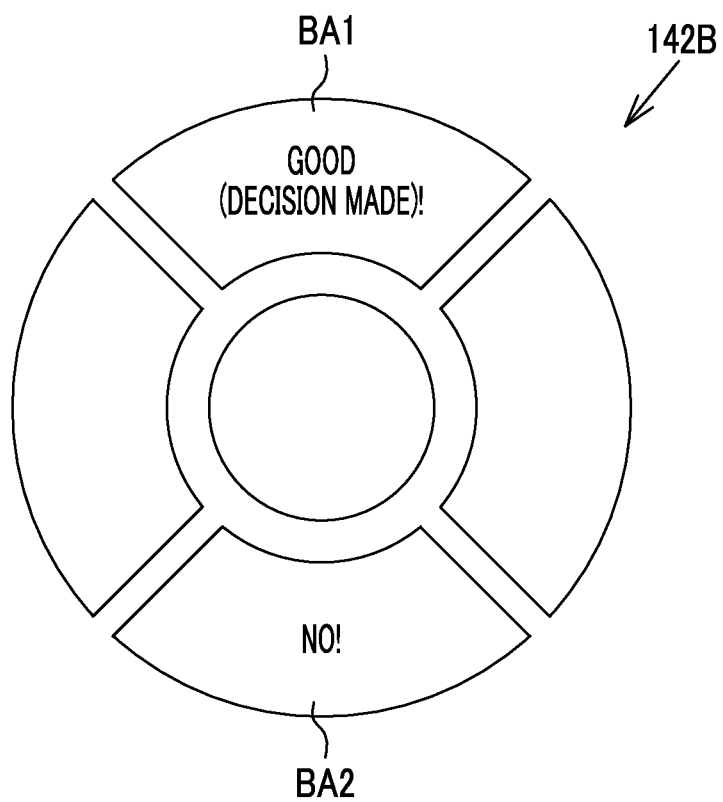
FIG. 17 is a view showing another example of a steering switch.
Figure 18:
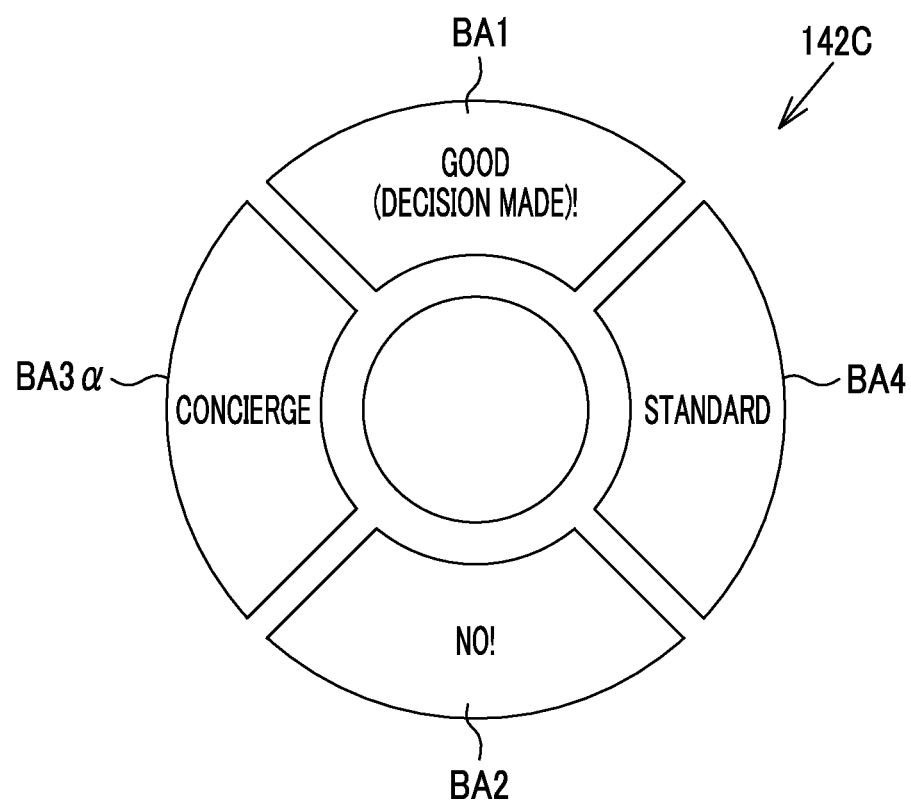
FIG. 18 is a view showing still another example of a steering switch.

In each of the aforementioned embodiments, the configuration in which the steering switch has the third operation button BA3 and the fourth operation button BA4 that are operated in operating the in-vehicle components independently of an operation proposal from the agent ECU 100 as well as the first operation button BA1 and the second operation button BA2 that are operated in responding to the operation proposal from the agent ECU 100 has been described as an example. It should be noted, however, that a configuration in which a steering switch 142B that has only the first operation button BA1 and the second operation button BA2 that are operated in responding to an operation proposal from the agent ECU 100 is employed as another example of the steering switch as shown in FIG. 17 may be adopted. Besides, a configuration in which a steering switch 142C having a third operation button BA3$\alpha$ that is operated in activating a concierge service instead of the third operation button BA3 that is operated in operating the in-vehicle components through manual input by the driver himself or herself shown in FIG. 12 is employed as another example of the steering switch as shown in FIG. 18 may be adopted. Moreover, in the configuration of this steering switch 142B or 142C as well, a response, from the driver, to the operation proposal can be detected through operation of the steering switch 142B or 142C and used as the reward function in reinforced learning.

In each of the aforementioned embodiments, Q-learning is carried out as a method of reinforced learning. Instead of this, other methods, for example, an SARSA method, an actor critic method and the like can also be used as the method of reinforced learning.

What is claimed is:

1. An information providing device comprising:
an agent electronic control unit including
a state space construction unit that is configured to define a state of a vehicle by associating a plurality of types of vehicle data with one another, and construct a state space as a set of a plurality of states,
an action space construction unit that is configured to define, as an action, data indicating contents of an operation of an in-vehicle component that is performed through a response, from a driver, to an operation proposal for the in-vehicle component, and construct an action space as a set of a plurality of actions,
a reinforced learning unit that is configured to accumulate a history of the response, from the driver, to the operation proposal for the in-vehicle component, set a reward function as an index representing an appropriateness degree of the operation proposal for the in-vehicle component while using the accumulated history, and calculate a probability distribution of performance of each of the actions constructing the action space in each of the states constructing the state space, through reinforced learning based on the reward function,
a dispersion degree computation unit that is configured to compute a dispersion degree of the probability distribution that is calculated by the reinforced learning unit, and
an information providing unit that is configured to make a definitive operation proposal to fix a target action as a target of the operation proposal and output the target action when the dispersion degree of the probability distribution that is computed by the dispersion degree computation unit is smaller than a threshold, and make a trial-and-error operation proposal to select the target action as the target of the operation proposal from a plurality of candidates and output the target action when the dispersion degree of the probability distribution that is computed by the dispersion degree computation unit is equal to or larger than the threshold.

2. The information providing device according to claim 1, wherein
the reinforced learning unit is configured to set, as the reward function, a frequency of performing the operation of the in-vehicle component through the driver's response to the operation proposal for the in-vehicle component, and update the reward function in accordance with a change in an operation history of the operation of the in-vehicle component when the in-vehicle component is operated in accordance with the operation proposal for the in-vehicle component.

3. The information providing device according to claim 1, wherein
the state space construction unit is configured to construct the state space as a set of states as a group of data that associate an operation situation of the in-vehicle component, characteristics of a passenger or passengers of the vehicle and a running situation of the vehicle with one another.

4. An information providing device comprising:
an agent electronic control unit including
a state space construction unit that is configured to define a state of a vehicle by associating a plurality of types of vehicle data with one another, and construct a state space as a set of a plurality of states,
an action space construction unit that is configured to define, as an action, data indicating contents of an operation of an in-vehicle component that is performed through a response, from a driver, to an operation proposal for the in-vehicle component, and construct an action space as a set of a plurality of actions,
a reinforced learning unit that is configured to accumulate a history of the response, from the driver, to the operation proposal for the in-vehicle component, set a reward function as an index representing an appropriateness degree of the operation proposal for the in-vehicle component while using the accumulated history, and calculate a probability distribution of performance of each of the actions constructing the action space in each of the states constructing the state space, through reinforced learning based on the reward function,
a dispersion degree computation unit that is configured to compute a dispersion degree of the state space by summating the dispersion degree of the probability distribution that is calculated by the reinforced learning unit as to the plurality of the states constructing the state space, and
an information providing unit that is configured to make a definitive operation proposal to fix a target action as a target of the operation proposal and output the target action when the dispersion degree of the state space that is computed by the dispersion degree computation unit is smaller than a threshold, and make a trial-and-error operation proposal to select the target action as the target of the operation proposal from a plurality of candidates and output the target action when the dispersion degree of the state space that is computed by the dispersion degree computation unit is equal to or larger than the threshold.

5. The information providing device according to claim 4, wherein
the reinforced learning unit is configured to adopt, as a policy, mapping from each of the states constructing the state space to each of the actions constructing the action space, set, as a state value function, an expected value of a cumulative reward that is obtained when the policy is followed in each of the states, estimate, as an optimal action value function, an expected value of a cumulative reward that is always obtained when an optimal policy is followed after a predetermined action is selected from the action space in each of the states constructing the state space on an assumption that the optimal policy is the policy that maximizes the state value function in all the states constructing the state space, and calculate the probability distribution based on the estimated optimal action value function, and
the information providing unit is configured to make the definitive operation proposal targeting an action that maximizes the optimal action value function in a present state, when the dispersion degree of the state space that is computed by the dispersion degree computation unit is smaller than the threshold.

6. The information providing device according to claim 5, wherein
the information providing unit is configured to make the trial-and-error operation proposal with such a tendency as to enhance a frequency of selecting an action as a target as a probability density of the probability distribution of the action in the present state rises, when the dispersion degree of the state space that is computed by the dispersion degree computation unit is equal to or larger than the threshold.

7. The information providing device according to claim 5, wherein the dispersion degree computation unit is configured to define, as an entropy, the dispersion degree of the probability distribution of performance of each of the actions constructing the action space in each of the states constructing the state space, and define the dispersion degree of the state space as an average entropy, and the information providing unit is configured to select the definitive operation proposal or the trial-and-error operation proposal with such a tendency as to enhance a frequency of making the trial-and-error operation proposal as an $\epsilon$-value increases, while using an $\epsilon$-greedy method in which a value of the average entropy is set as the $\epsilon$-value.

8. The information providing device according to claim 4, wherein the reinforced learning unit is configured to set, as the reward function, a frequency of performing the operation of the in-vehicle component through the driver's response to the operation proposal for the in-vehicle component, and update the reward function in accordance with a change in an operation history of the operation of the in-vehicle component when the in-vehicle component is operated in accordance with the operation proposal for the in-vehicle component.

9. The information providing device according to claim 4, wherein the state space construction unit is configured to construct the state space as a set of states as a group of data that associate an operation situation of the in-vehicle component, characteristics of a passenger or passengers of the vehicle and a running situation of the vehicle with one another.

10. A non-transitory computer readable medium that stores an information providing program, comprising:

the information providing program that is programmed to cause a computer to realize a state space construction function of defining a state of a vehicle by associating a plurality of types of vehicle data with one another, and constructing a state space as a set of a plurality of states, an action space construction function of defining, as an action, data indicating contents of an operation of an in-vehicle component that is performed through a response, from a driver, to an operation proposal for the in-vehicle component, and constructing an action space as a set of a plurality of actions, a reinforced learning function of accumulating a history of the response, from the driver, to the operation proposal for the in-vehicle component, setting a reward function as an index representing an appropriateness degree of the operation proposal for the in-vehicle component while using the accumulated history, and calculating a probability distribution of performance of each of the actions constructing the action space in each of the states constructing the state space, through reinforced learning based on the reward function, a dispersion degree computation function of computing a dispersion degree of the probability distribution that is calculated through the reinforced learning function, and an information providing function of making a definitive operation proposal to fix a target action as a target of the operation proposal and output the target action when the dispersion degree of the probability distribution that is computed through the dispersion degree computation function is smaller than a threshold, and making a trial-and-error operation proposal to select the target action as the target of the operation proposal from a plurality of candidates and output the target action when the dispersion degree of the probability distribution that is computed through the dispersion degree computation function is equal to or larger than the threshold.

11. A non-transitory computer readable medium that stores an information providing program, comprising:

the information providing program that is programmed to cause a computer to realize a state space construction function of defining a state of a vehicle by associating a plurality of types of vehicle data with one another, and constructing a state space as a set of a plurality of states, an action space construction function of defining, as an action, data indicating contents of an operation of an in-vehicle component that is performed through a response, from a driver, to an operation proposal for the in-vehicle component, and constructing an action space as a set of a plurality of actions, a reinforced learning function of accumulating a history of the response, from the driver, to the operation proposal for the in-vehicle component, setting a reward function as an index representing an appropriateness degree of the operation proposal for the in-vehicle component while using the accumulated history, and calculating a probability distribution of performance of each of the actions constructing the action space in each of the states constructing the state space, through reinforced learning based on the reward function, a dispersion degree computation function of computing a dispersion degree of the state space by summating the dispersion degree of the probability distribution that is calculated through the reinforced learning function as to the plurality of the states constructing the state space, and an information providing function of making a definitive operation proposal to fix a target action as a target of the operation proposal and output the target action when the dispersion degree of the state space that is computed through the dispersion degree computation function is smaller than a threshold, and making a trial-and-error operation proposal to select the target action as the target of the operation proposal from a plurality of candidates and output the target action when the dispersion degree of the state space that is computed through the dispersion degree computation function is equal to or larger than the threshold.

* * * * *